United States Patent [19]

Fenelon

[11] Patent Number: 5,692,410
[45] Date of Patent: Dec. 2, 1997

[54] ROTATABLE APPARATUS HAVING A STRESS DISSIPATION STRUCTURE

[76] Inventor: Paul J. Fenelon, 13 Invorary, Nashville, Tenn. 37215

[21] Appl. No.: 488,344

[22] Filed: Jun. 7, 1995

Related U.S. Application Data

[63] Continuation-in-part of PCT/US94/01577, Feb. 9, 1994, which is a continuation-in-part of Ser. No. 160,544, Dec. 1, 1993, which is a continuation-in-part of Ser. No. 15,332, Feb. 9, 1993, Pat. No. 5,307,705.

[51] Int. Cl.$^6$ .................. F16H 55/14; F16D 3/52
[52] U.S. Cl. .................. 74/411; 464/61; 464/62; 464/100
[58] Field of Search ............. 74/411; 464/61, 464/62, 98, 99, 100

[56] References Cited

U.S. PATENT DOCUMENTS

| | | |
|---|---|---|
| Re. 34,105 | 10/1992 | Flotow et al. . |
| 284,290 | 9/1883 | Gilliland . |
| 287,711 | 10/1883 | Ortman . |
| 288,134 | 11/1883 | Stone, Jr. . |
| 312,780 | 2/1885 | Wilcox . |
| 314,472 | 3/1885 | Plamondon . |
| 379,022 | 3/1888 | Morgan . |
| 459,325 | 9/1891 | Whitney .................. 464/62 X |
| 680,654 | 8/1901 | Gomber . |
| 820,789 | 5/1906 | Hutchins . |
| 1,060,865 | 5/1913 | Sundh . |
| 1,265,811 | 5/1918 | Ohlson . |
| 1,424,203 | 8/1922 | Keller . |
| 1,589,795 | 6/1926 | Emrich . |
| 1,674,226 | 6/1928 | Reed . |
| 1,750,827 | 3/1930 | Wemp . |
| 1,757,517 | 5/1930 | Eaton . |
| 1,780,727 | 11/1930 | Tenney . |
| 1,913,525 | 6/1933 | Valentine et al. . |
| 1,925,278 | 9/1933 | Paton . |

(List continued on next page.)

FOREIGN PATENT DOCUMENTS

| | | | |
|---|---|---|---|
| 60-157516 | 8/1985 | Japan .................. 464/100 |
| 3-197232A | 8/1991 | Japan . | |
| 4-282053A | 10/1992 | Japan . | |
| 223533 | 10/1968 | U.S.S.R. .................. 74/411 |
| 682196 | 11/1952 | United Kingdom . | |
| 759215 | 10/1956 | United Kingdom . | |
| 792330 | 3/1958 | United Kingdom . | |
| 989898 | 4/1965 | United Kingdom . | |

OTHER PUBLICATIONS

Machine Design—Basics of Design Engineering, "Components for drivelines", Jun. 1992, pp. 92–96.
Photographs of sunroof motor (prior to Jun. 7, 1995).
Photographs of window lift motor having three elastomeric inserts (prior to Dec. 1, 1993).
Photographs of window lift motor having a rim, web, hub and elastomeric material (prior to Dec. 1, 1993).

*Primary Examiner*—Allan D. Herrmann
*Attorney, Agent, or Firm*—Harness, Dickey & Pierce, P.L.C.

[57] ABSTRACT

A rotatable apparatus includes a pair of rotatable members joined by a stress dissipating structure. The stress dissipating structure can be employed in a gear, sprocket, clutch or the like. In one aspect of the present invention, the stress dissipating structure includes an elastomeric material and a web which radially extend outward from the hub. In another aspect of the present invention, the stress dissipating structure includes a plurality of rotationally flexible spoke-like structures radially extending between the rim and the hub. In a further aspect of the present invention, corrugated spokes are used. An additional aspect of the present invention provides a stress dissipating structure employing various anti-buckling plate configurations. In still another preferred aspect of the present invention, the stress dissipating structure includes a plurality of rotatably deformable formations. Furthermore, the present invention provides a compressible washer stress reduction structure. In yet another aspect of the present invention, an external clutch mechanism together with an internal stress reduction system are employed.

14 Claims, 14 Drawing Sheets

U.S. PATENT DOCUMENTS

| | | |
|---|---|---|
| 1,928,763 | 10/1933 | Rosenberg . |
| 1,967,322 | 7/1934 | Pearmain . |
| 2,004,712 | 6/1935 | Thiry . |
| 2,049,133 | 7/1936 | Pierce . |
| 2,105,188 | 1/1938 | Guy . |
| 2,118,913 | 5/1938 | Bachman . |
| 2,157,211 | 5/1939 | McDonald . |
| 2,162,071 | 6/1939 | Eason . |
| 2,182,387 | 12/1939 | Probst . |
| 2,187,706 | 1/1940 | Julien . |
| 2,260,869 | 10/1941 | Ruesenberg . |
| 2,301,600 | 11/1942 | Wilson . |
| 2,306,539 | 12/1942 | Jones . |
| 2,307,129 | 1/1943 | Hines et al. . |
| 2,325,193 | 7/1943 | Nutt et al. . |
| 2,372,625 | 3/1945 | Denton ................................ 74/411 |
| 2,380,776 | 7/1945 | Miller . |
| 2,400,586 | 5/1946 | Zimmermann . |
| 2,460,630 | 2/1949 | Fawick . |
| 2,560,644 | 7/1951 | Hartzell . |
| 2,591,734 | 4/1952 | Smith et al. . |
| 2,702,995 | 3/1955 | Biedess . |
| 2,753,731 | 7/1956 | McWethy . |
| 2,857,777 | 10/1958 | Porter . |
| 2,869,388 | 1/1959 | Kreis . |
| 2,904,150 | 9/1959 | Sand . |
| 2,939,331 | 6/1960 | Weeks . |
| 2,955,481 | 10/1960 | Jackel . |
| 2,956,187 | 10/1960 | Wood . |
| 2,961,856 | 11/1960 | Selzer . |
| 2,998,114 | 8/1961 | Altmann . |
| 3,020,036 | 2/1962 | Kleinschmidt . |
| 3,057,220 | 10/1962 | Parr . |
| 3,071,850 | 1/1963 | Haushalter . |
| 3,076,352 | 2/1963 | Larsh . |
| 3,078,206 | 2/1963 | Skura . |
| 3,167,975 | 2/1965 | Durand . |
| 3,171,270 | 3/1965 | Dahlberg . |
| 3,216,267 | 11/1965 | Dolza . |
| 3,218,828 | 11/1965 | Thelander . |
| 3,223,214 | 12/1965 | Kuivinen . |
| 3,236,347 | 2/1966 | Puls et al. . |
| 3,245,508 | 4/1966 | Livezey . |
| 3,257,860 | 6/1966 | Runde et al. . |
| 3,265,172 | 8/1966 | Atsumi et al. . |
| 3,283,864 | 11/1966 | Motsch . |
| 3,304,795 | 2/1967 | Rouverol . |
| 3,323,624 | 6/1967 | Maurice . |
| 3,360,998 | 1/1968 | Griffel . |
| 3,362,256 | 1/1968 | Cluff et al. . |
| 3,375,911 | 4/1968 | Smirl . |
| 3,406,583 | 10/1968 | Baier . |
| 3,428,155 | 2/1969 | Binder et al. . |
| 3,557,573 | 1/1971 | Hansgen . |
| 3,557,633 | 1/1971 | Frerichs . |
| 3,565,223 | 2/1971 | Pierce . |
| 3,628,353 | 12/1971 | Armstrong . |
| 3,640,363 | 2/1972 | Spalding . |
| 3,667,317 | 6/1972 | Hillingrathner . |
| 3,757,608 | 9/1973 | Willner . |
| 3,770,088 | 11/1973 | Shono . |
| 3,791,499 | 2/1974 | Ryan . |
| 3,885,657 | 5/1975 | Sato . |
| 3,943,788 | 3/1976 | Kummel et al. . |
| 3,952,546 | 4/1976 | Nakano et al. . |
| 4,004,669 | 1/1977 | Roderick . |
| 4,178,811 | 12/1979 | Shepherd . |
| 4,184,578 | 1/1980 | Moore et al. . |
| 4,241,818 | 12/1980 | Miller . |
| 4,296,851 | 10/1981 | Pierce . |
| 4,296,853 | 10/1981 | Kronert . |
| 4,296,854 | 10/1981 | Staub, Jr. . |
| 4,300,670 | 11/1981 | Mathues . |
| 4,328,879 | 5/1982 | Tone . |
| 4,441,600 | 4/1984 | Caray . |
| 4,461,376 | 7/1984 | Lech, Jr. et al. . |
| 4,465,172 | 8/1984 | Gatewood . |
| 4,474,276 | 10/1984 | Loizeau . |
| 4,478,326 | 10/1984 | Rotter . |
| 4,511,186 | 4/1985 | Sasamoto . |
| 4,530,673 | 7/1985 | Lamarche . |
| 4,537,298 | 8/1985 | Loizeau . |
| 4,541,296 | 9/1985 | Oyafuso . |
| 4,549,642 | 10/1985 | Loizeau . |
| 4,552,543 | 11/1985 | Wolf et al. . |
| 4,558,773 | 12/1985 | Schafer . |
| 4,560,366 | 12/1985 | Loizeau . |
| 4,560,367 | 12/1985 | Wolf et al. . |
| 4,562,913 | 1/1986 | Cucinotta et al. . |
| 4,564,097 | 1/1986 | Kabayama . |
| 4,572,344 | 2/1986 | Horiuchi et al. . |
| 4,574,930 | 3/1986 | Koitabashi . |
| 4,591,040 | 5/1986 | Schraut et al. . |
| 4,606,451 | 8/1986 | Martiinez-Corral et al. . |
| 4,609,088 | 9/1986 | Takeuchi . |
| 4,615,096 | 10/1986 | Foster . |
| 4,616,742 | 10/1986 | Matsushita . |
| 4,624,351 | 11/1986 | Lutz et al. . |
| 4,629,048 | 12/1986 | Draper et al. . |
| 4,632,235 | 12/1986 | Flotow et al. . |
| 4,635,779 | 1/1987 | Bacher et al. . |
| 4,635,780 | 1/1987 | Wiggen . |
| 4,638,684 | 1/1987 | Maucher . |
| 4,646,899 | 3/1987 | Murakami . |
| 4,674,351 | 6/1987 | Byrd . |
| 4,680,979 | 7/1987 | Morishita et al. . |
| 4,693,354 | 9/1987 | Umeyama et al. . |
| 4,696,384 | 9/1987 | Huber . |
| 4,709,796 | 12/1987 | Uenohara . |
| 4,729,464 | 3/1988 | Friedmann . |
| 4,732,250 | 3/1988 | Maucher et al. . |
| 4,741,420 | 5/1988 | Fujito et al. . |
| 4,744,448 | 5/1988 | Maycock et al. . |
| 4,760,906 | 8/1988 | Flotow et al. . |
| 4,764,152 | 8/1988 | Jorg et al. . |
| 4,793,455 | 12/1988 | Tabuchi et al. . |
| 4,796,728 | 1/1989 | Kanengieter et al. . |
| 4,846,323 | 7/1989 | Fukushima . |
| 4,891,033 | 1/1990 | Heyser . |
| 4,892,008 | 1/1990 | Naudin et al. . |
| 4,899,862 | 2/1990 | Graton et al. . |
| 4,913,275 | 4/1990 | Kobayashi et al. . |
| 4,919,246 | 4/1990 | Gay et al. . |
| 4,938,729 | 7/1990 | Hamada et al. . |
| 4,951,515 | 8/1990 | Morishita et al. . |
| 4,972,734 | 11/1990 | Hyodo et al. . |
| 4,987,987 | 1/1991 | Damon et al. . |
| 4,996,892 | 3/1991 | Yamamoto . |
| 5,032,107 | 7/1991 | Umeyama et al. . |
| 5,052,244 | 10/1991 | Kamiya et al. . |
| 5,062,517 | 11/1991 | Muchmore et al. . |
| 5,064,041 | 11/1991 | Graton et al. . |
| 5,064,042 | 11/1991 | Kuhne et al. . |
| 5,067,602 | 11/1991 | Flotow et al. . |
| 5,088,964 | 2/1992 | Kuhne . |
| 5,090,543 | 2/1992 | Takeuchi . |
| 5,127,279 | 7/1992 | Barthruff . |
| 5,135,089 | 8/1992 | Kovac . |
| 5,138,902 | 8/1992 | Muller et al. . |
| 5,139,122 | 8/1992 | Maeda et al. . |
| 5,146,811 | 9/1992 | Jackel . |
| 5,147,246 | 9/1992 | Focqueur et al. . |

| | | |
|---|---|---|
| 5,158,508 | 10/1992 | Sakaguchi et al. . |
| 5,161,660 | 11/1992 | Huber . |
| 5,169,357 | 12/1992 | Graton . |
| 5,186,077 | 2/1993 | Nakane . |
| 5,195,625 | 3/1993 | Chang et al. . |
| 5,201,394 | 4/1993 | Suzuki . |
| 5,203,835 | 4/1993 | Kohno et al. . |
| 5,205,389 | 4/1993 | Raab et al. . |
| 5,209,139 | 5/1993 | Janiszewski . |
| 5,209,330 | 5/1993 | Macdonald . |
| 5,209,334 | 5/1993 | Fischer et al. . |
| 5,213,188 | 5/1993 | Feser et al. . |
| 5,217,409 | 6/1993 | Dalbiez . |
| 5,218,884 | 6/1993 | Rohrle . |
| 5,230,409 | 7/1993 | Tanaka et al. . |
| 5,230,415 | 7/1993 | Ament et al. . |
| 5,240,458 | 8/1993 | Linglain et al. . |
| 5,245,889 | 9/1993 | Kohno et al. . |
| 5,246,398 | 9/1993 | Birk et al. . |
| 5,246,399 | 9/1993 | Yanko et al. . |
| 5,255,761 | 10/1993 | Zaremsky . |
| 5,257,687 | 11/1993 | Cooke . |
| 5,261,517 | 11/1993 | Hering . |
| 5,269,725 | 12/1993 | Maucher et al. . |
| 5,273,145 | 12/1993 | Corral et al. . |
| 5,279,398 | 1/1994 | Graton et al. . |
| 5,289,737 | 3/1994 | Kuhne . |
| 5,293,978 | 3/1994 | Reik et al. . |
| 5,307,705 | 5/1994 | Fenelon . |
| 5,308,282 | 5/1994 | Hansen et al. . |
| 5,310,025 | 5/1994 | Anderson . |
| 5,314,051 | 5/1994 | Marie et al. . |
| 5,318,478 | 6/1994 | Khune et al. . |
| 5,322,149 | 6/1994 | Szadkowski . |
| 5,322,474 | 6/1994 | Hashimoto et al. . |
| 5,333,713 | 8/1994 | Hagnere et al. . |
| 5,349,883 | 9/1994 | Reik et al. . |
| 5,352,156 | 10/1994 | Klein et al. . |
| 5,360,090 | 11/1994 | Stretch et al. . |

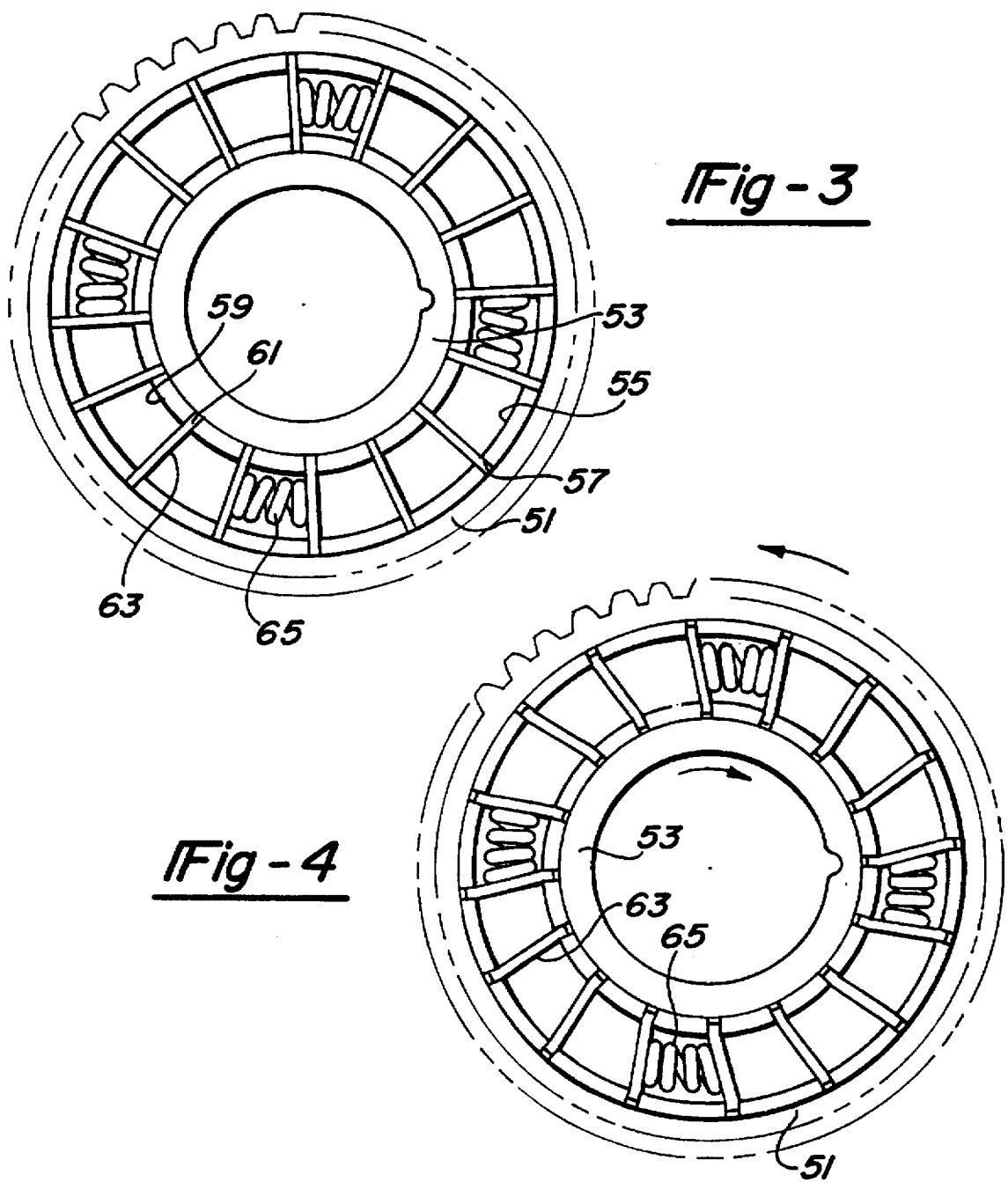

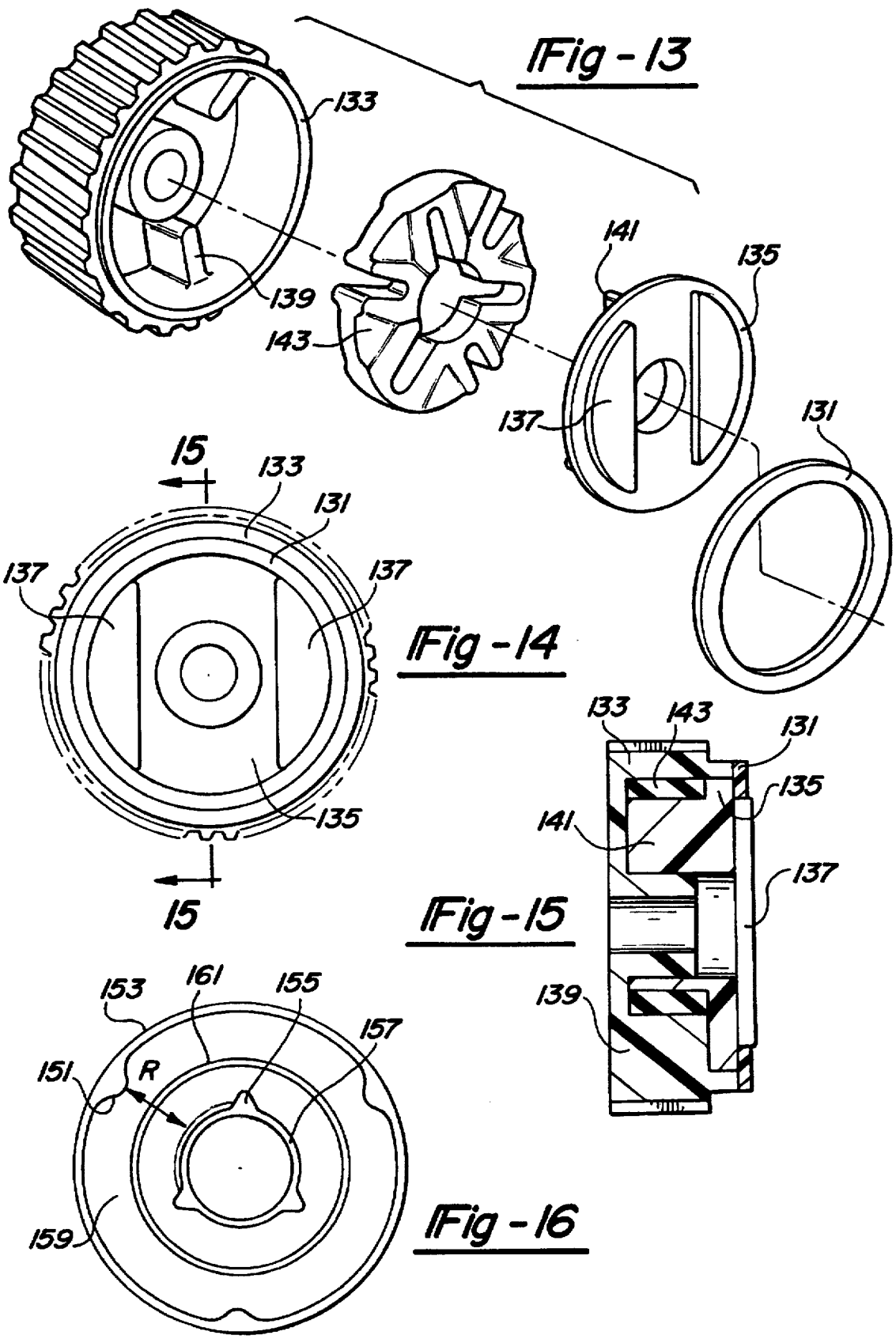

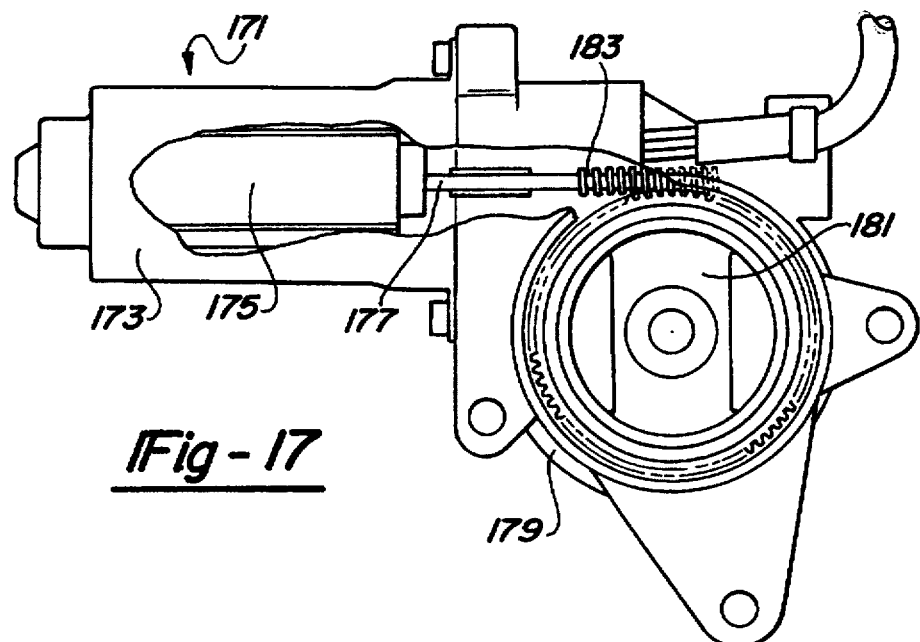
Fig-17
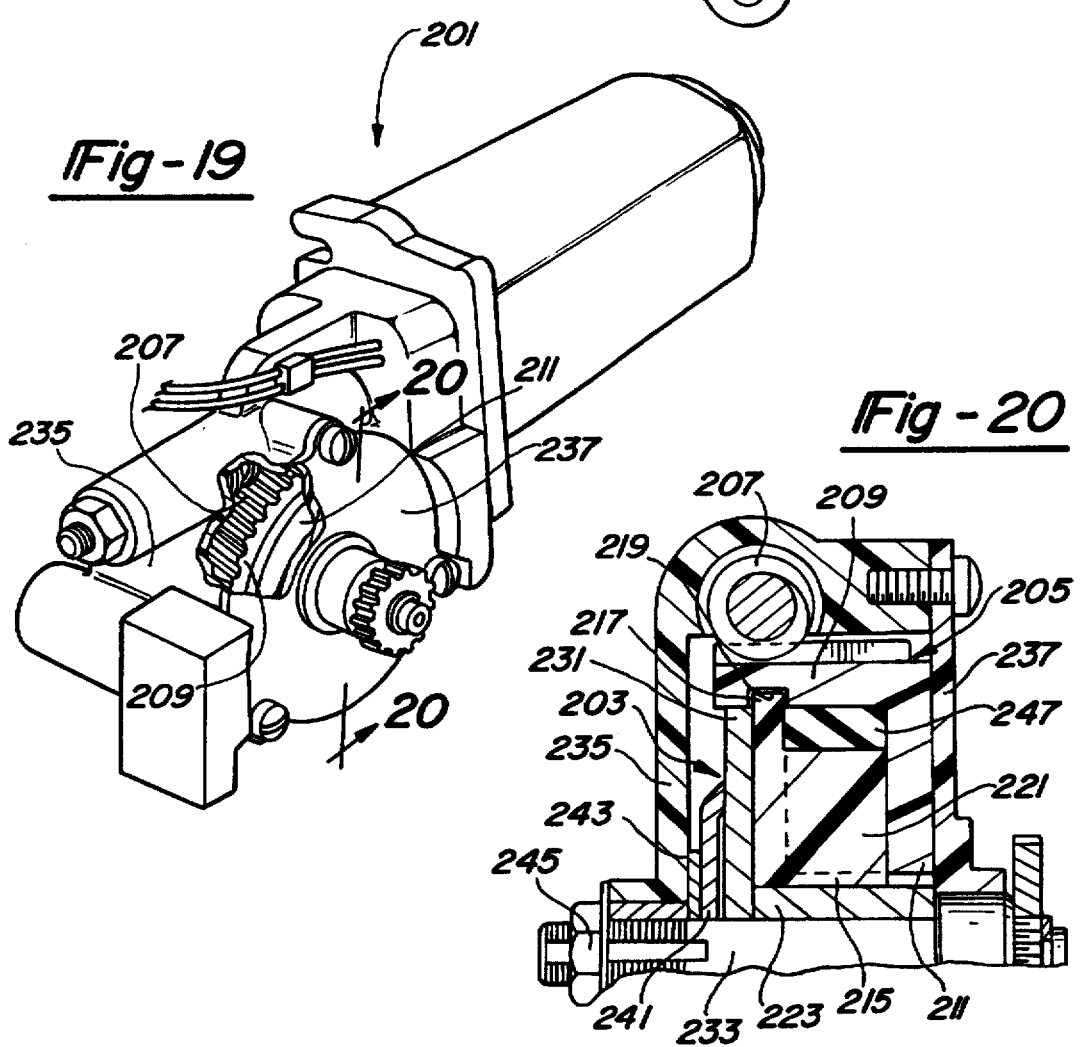
Fig-19
Fig-20

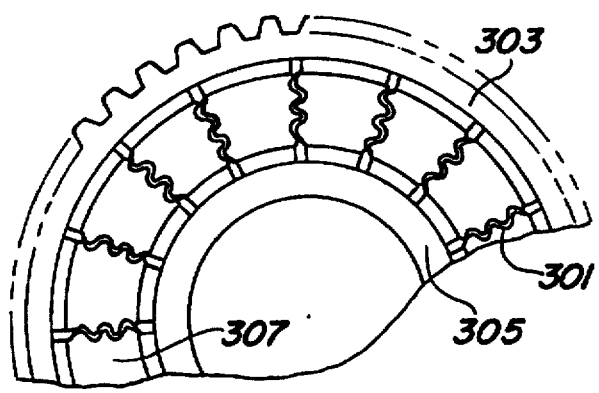
_Fig-21_
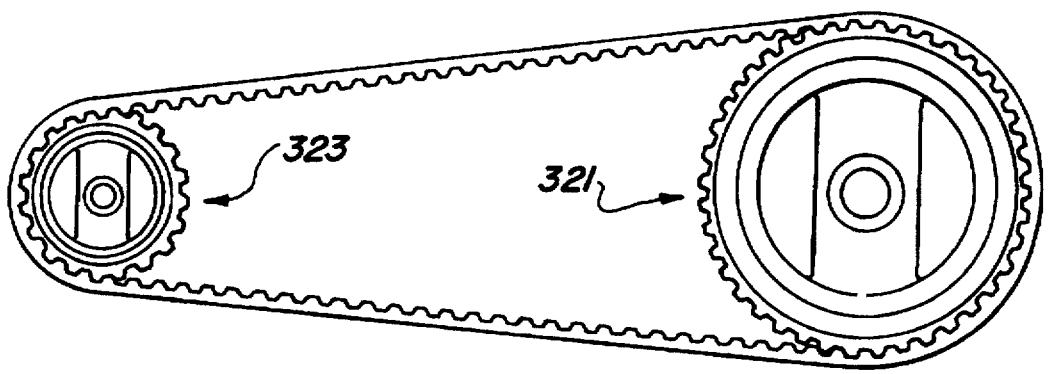
_Fig-22_
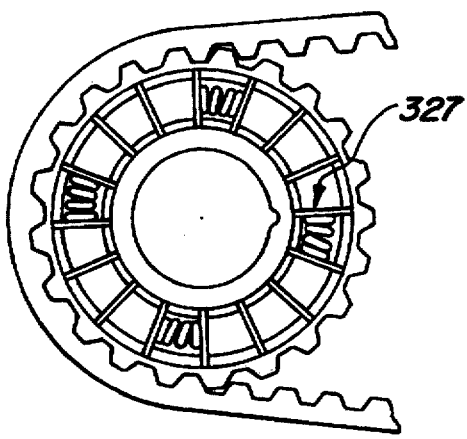
_Fig-23_
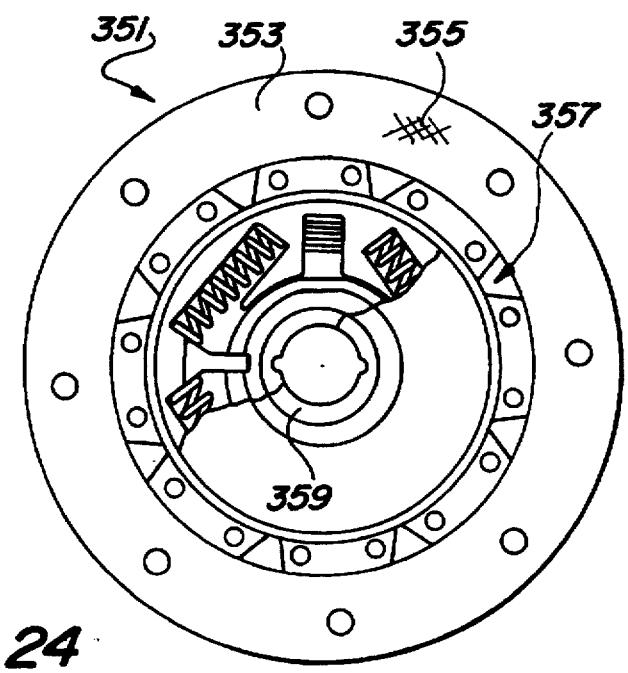
_Fig-24_

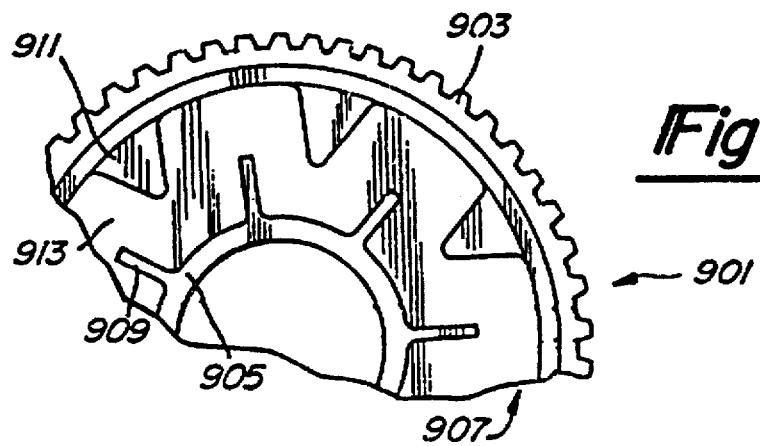
*Fig-36*
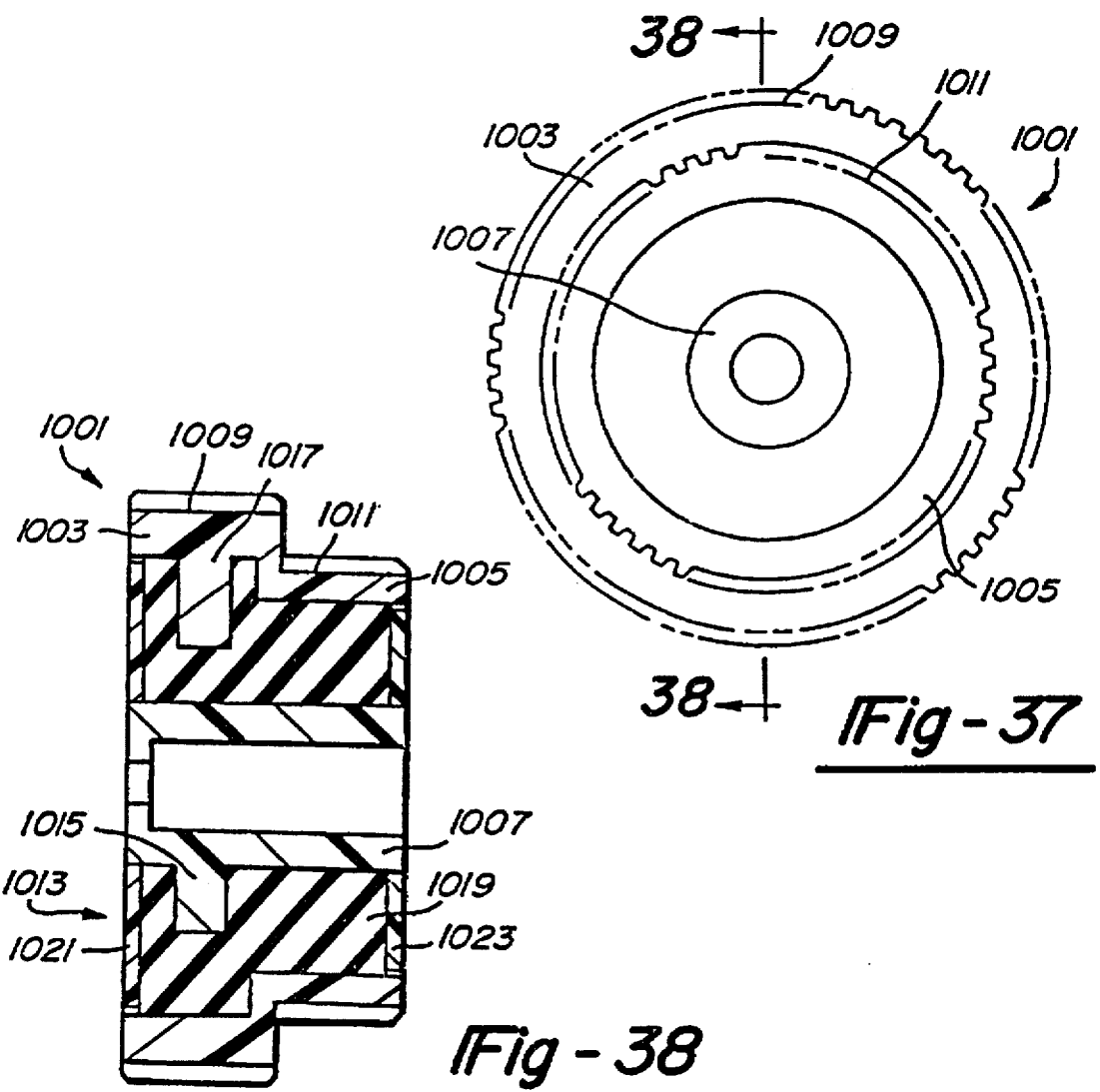
*Fig-37*
*Fig-38*

ROTATABLE APPARATUS HAVING A STRESS DISSIPATION STRUCTURE

CROSS REFERENCE TO RELATED APPLICATIONS

This application is a Continuation-In-Part of PCT Application Serial No. PCT/US94/01577 filed Feb. 9, 1994 which designated the United States as a Continuation-In-Part of U.S. application Ser. No. 160,544, filed Dec. 1, 1993, which is a Continuation-In-Part of U.S. application Ser. No. 08/015,332, filed Feb. 9, 1993, now issued on May 3, 1994 as U.S. Pat. No. 5,307,705; this application is also directly a Continuation-In-Part of U.S. application Ser. No. 160,544, filed Dec. 1, 1993, which is a Continuation-In-Part of U.S. application Ser. No. 08/015,332, filed Feb. 9, 1993, now issued on May 3, 1994 as U.S. Pat. No. 5,307,705; all of these are incorporated by reference herewithin.

BACKGROUND OF THE INVENTION

This invention relates generally to rotatable apparatuses and specifically to a rotatable apparatus having a pair of rotatable members joined by a stress dissipating structure.

The primary function of a gear is to transmit power from a power generating source to an operating device. This is achieved through the intermeshing and continuity of action between the teeth of a driving gear which is associated with the power source and the teeth of the mating gear which is associated with the operating device. Since a gear is a rotating body, a state of dynamic equilibrium must be attained. Therefore, to be in dynamic equilibrium all of the reactions from the rotating gear must be neutralized by equal and opposite forces supporting the gear shaft.

Traditional gear design comprises a central hub, a web extending radially outward therefrom which is, in turn, peripherally bordered by an integral radial rim having geared teeth thereupon. Gear failure can occur if manufacturing tolerances, material type, and gear design are not matched to the service application. Furthermore, since gears have historically been manufactured from a single homogeneous material, the bulk rigidity and strength of the web is generally greater than or equal to that of the hub and rim. Thus, torsional stresses created through start-up, shut-down, overload, or through cyclical fatigue are localized in the teeth and hub areas. As a result, gears typically fail at the root of the teeth or in the hub region. Such failures include excessive wear, plastic flow or creep, tooth bending fatigue, contact fatigue (pitting and spalling), thermal fatigue, tooth bending impact, tooth shear, tooth chipping, case crushing, torsional shear and stress ruptures. Many of these failures are due primarily to overload, cycling fatigue, and/or start-up and shut-down rotational shock referenced above that is especially prevalent in gears that perform in non-constant rotation service applications.

An alternative gear design that has been used is a compliant gear having a rigid one-piece hub and web, and a separate rim member with a rubber-like insert or ring located between the outer radial edge of the web and the inner radial edge of the rim. An example of this configuration is disclosed in U.S. Pat. No. 2,307,129 entitled "Shock Proof Gear", issued to Hines et al. on Jan. 5, 1943. Although this rubber-like insert is supposed to dampen audible vibrations and somewhat reduce resultant stresses within the gear, under load the rim is capable of compressing one side of the rubber-like insert such that the rotational axis of the rim could become axially offset from the rotational axis of the hub. This misalignment can cause partial or complete disengagement of the gear teeth of the compliant gear from those of its mating gear. In addition, gears having this type of rubber-like insert strictly between the web and the rim are subject to the rim torquing away from the hub in a transverse direction normal to the direction of rotation. Under load this transverse movement may also cause misalignment of the mating gear teeth which will localize stresses upon distinct portions of each tooth. Moreover, the hub and rim may not provide an adequate attachment, and thus force transfer, surface for the rubber-like insert in extreme torque situations. A similar design using elastomeric laminates with a shim therebetween is disclosed in U.S. Pat. No. 4,674,351 entitled "Compliant Gear", issued to Byrd on Jun. 23, 1987.

Another compliant rotating member configuration is disclosed in FIG. 8 of U.S. Pat. No. 3,216,267 entitled "Rotary Motion Transmitting Mechanism For Internal Combustion Engines And The Like", issued to Dolza on Nov. 9, 1965. That sprocket/gear design contains a stamped cup-shaped hub which has an outward radially extending flange and a cushioning member fully attached to the side thereof. The rim of the sprocket/gear has a generally L-shaped cross section with the radial inward leg being fully attached to the opposite side of the cushioning member. In that design there are gaps between the outer circumference of the cushioning member and the inside radial surface of the rim and also a gap between the radially inward surface of the cushioning member and the radially outward horizontal edge of the cup-shaped hub section. While the sprocket/gear is designed to maintain angular torsional rigidity while having radial flexibility, under load the rim of the sprocket/gear may become elliptical and thus encroach upon the gaps created above and below the cushioning member. Moreover, the rotational axis of the rim may also become offset from the rotational axis of the hub under working conditions.

It is also known to provide a sunroof motor with a conventional gear having a unitary polymeric rim, offset web and hub. This gear further has a receptacle and an inner set of rim channels for receiving a metallic cup in an interlocking fashion. A Belleville washer frictionally rides against an outer surface of the metal cup and is interlocked to a pinion shaft. The gear is also journalled freely about the shaft. The amount of frictional force exerted by the Belleville washer against the cup is controlled by the amount of torque supplied to a pinion shaft engaging nut; thus, the Belleville washer acts as a clutch mechanism. However, this traditional sunroof motor is not provided with a rotational stress dissipating structure beyond the coaxial Belleville washer.

Furthermore, many conventional clutches employ rotation dampening devices and spring biasing devices. For instance, reference should be made to the following U.S. Pat. Nos.: 5,333,713 entitled "Friction Clutch" which issued to Hagnere et al. on Aug. 2, 1994; 5,322,141 entitled "Damped Driven Disk Assembly" which issued to Szadkowski on Jun. 21, 1994; 5,310,025 entitled "Aircraft Brake Vibration Damper" which issued to Anderson on May 10, 1994; 5,308,282 entitled "Pressure Plate for a Vibration Damper Assembly having Built-In Lash" which issued to Hansen et al. on May 3, 1994; 5,273,145 entitled "Hydraulic Clutch Control Means, In Particular For A Motor Vehicle" which issued to Corral et al. on Dec. 28, 1993; 5,186,077 entitled "Torque Variation Absorbing Device" which issued to Nakane on Feb. 16, 1993; 5,161,660 entitled "Clutch Plate with Plural Dampers" which issued to Huber on Nov. 10, 1992; RE 34,105 entitled "Internal Assisted Clutch" which issued to Flotow et al. on Oct. 20, 1992; and 4,996, 892 entitled "Flywheel Assembly" which issued to Yamamoto on Mar. 5, 1991; all of which are incorporated by reference herewithin. While many of these clutch constructions recognize an unsatisfied need for rotational stress reduction devices therein, further improvement in performance, cost and assembly would be desirable. For example, the rotationally oriented compression springs utilized in some of these constructions can be easily overcompressed beyond their elasticity limit, thus, leading to poor subsequent performance. By themselves, these compression springs are not well suited for repeated, high load, full compression.

SUMMARY OF THE INVENTION

In accordance with the present invention, the preferred embodiment of a rotatable apparatus includes a pair of rotatable members joined by a stress dissipating structure. The stress dissipating structure can be employed in a gear, sprocket, clutch or the like. In one embodiment of the present invention, the stress dissipating structure includes an elastomeric material and a web which radially extend outward from the hub. In another embodiment of the present invention, the stress dissipating structure includes a plurality of rotationally flexible spoke-like structures radially extending between the rim and the hub. In a further version of that embodiment, corrugated spokes are used. An additional aspect of the present invention provides a stress dissipating structure employing various anti-buckling plate configurations. In still another preferred embodiment of the present invention, the stress dissipating structure includes a plurality of rotatably deformable formations. Furthermore, the present invention may provide a compressible washer stress reduction structure. In yet another embodiment of the present invention, an external clutch mechanism together with internal stress reduction system are employed.

The configurations of the apparatus of the present invention are advantageous over conventional gears in that the present invention allows the stress dissipating structure to absorb structural stresses created between the hub and the rim due to instantaneous shocks created by apparatus rotational start-up or shut-down, cyclical fatigue, and/or overload. Furthermore, the stress dissipating resilient structure, especially when coupled with anti-buckling plates, provides significant lateral planar rigidity thereby resisting angular torsional deformation in a direction normal to the rotational axis between the rim and the hub while also discouraging rotational axis misalignment between the rim and the hub (i.e., the center to center distances between driven and drive gears are always maintained). The compressible washer and compressing block construction, and the spoke, groove and spring combination provide high load rotational stress dissipation for high temperature and severe applications. By matching the bulk torsional rigidity and allowed torsional deformations of the stress dissipating structure, which can be a function of its modulus of elasticity, its dimensional thickness, or the specific formations chosen, to that of the output coupling performance proportions, the beneficial characteristics of a conventional single piece homogenous gear, sprocket and clutch are maintained while the resilient structure acts to synergistically dissipate stresses between the rim and the hub. Additional objects, advantages, and features of the present invention will become apparent from the following description and appended claims, taken in conjunction with the accompanying drawings.

BRIEF DESCRIPTION OF THE DRAWINGS

FIG. 3 is a diagrammatic side elevational view showing the first preferred embodiment rotatable apparatus of the present invention in a nominal position;

FIG. 4 is diagrammatic side elevational view showing the first preferred embodiment rotatable apparatus of the present invention in a stress dissipating position;

FIG. 13 is an exploded perspective view showing a fourth preferred embodiment of a rotatable apparatus of the present invention;

FIG. 14 is a side elevational view showing the fourth preferred embodiment rotatable apparatus of the present invention;

FIG. 15 is a cross-sectional view, taken along line 15—15 of FIG. 14, showing the fourth preferred embodiment rotatable apparatus of the present invention;

FIG. 16 is a diagrammatic side elevational view showing a fifth preferred embodiment of a rotatable apparatus of the present invention;

FIG. 17 is a side elevation view, with portions broken away therefrom, showing a motor assembly and a rotatable apparatus of a sixth preferred embodiment of the present invention;

FIG. 19 is a perspective view, with portion broken away therefrom, showing the seventh preferred embodiment of the motor assembly and rotatable apparatus of the present invention;

FIG. 20 is a cross-sectional view, taken along line 20—20 of FIG. 19, showing the seventh preferred embodiment of the motor assembly and rotatable apparatus of the present invention;

5

Figure 25:
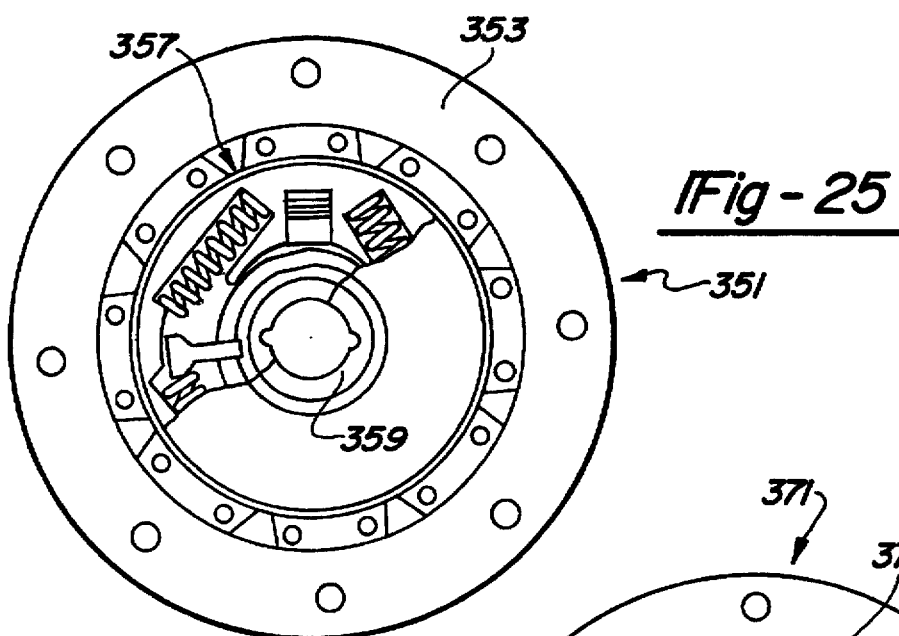
Figure 26:
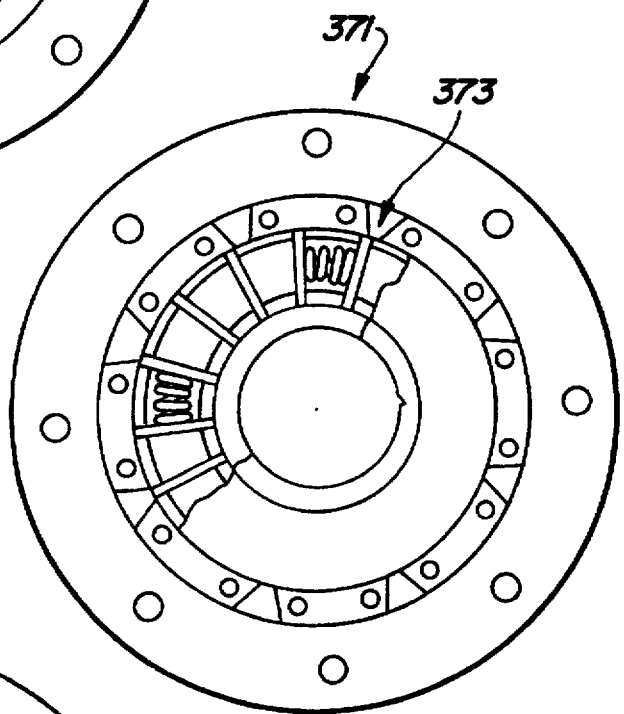
Figure 27:
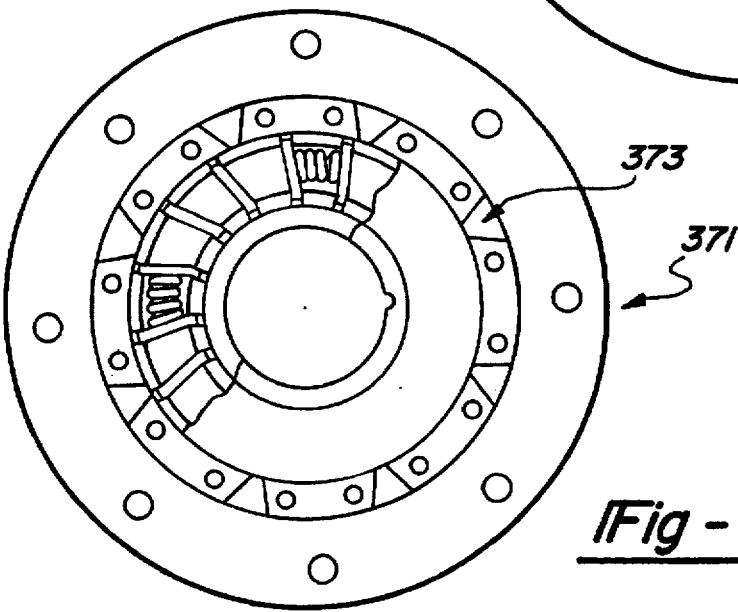
Figure 28:
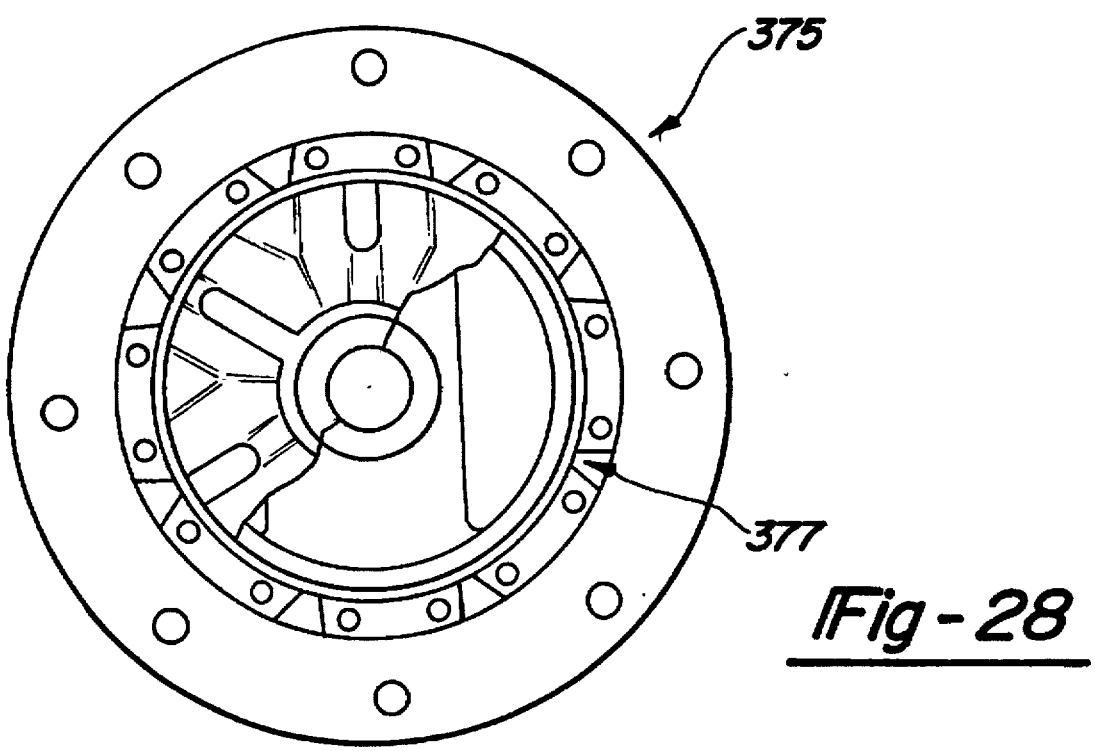
Figure 29:
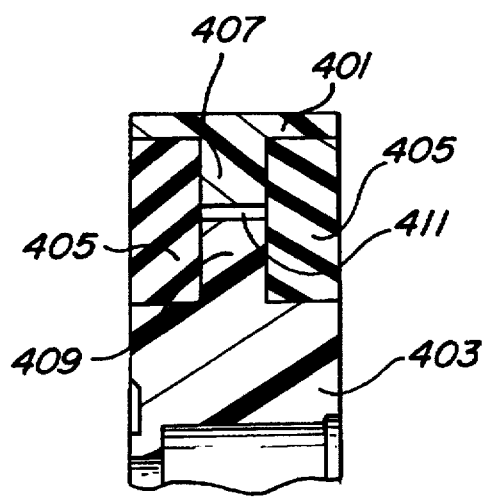
Figure 30:
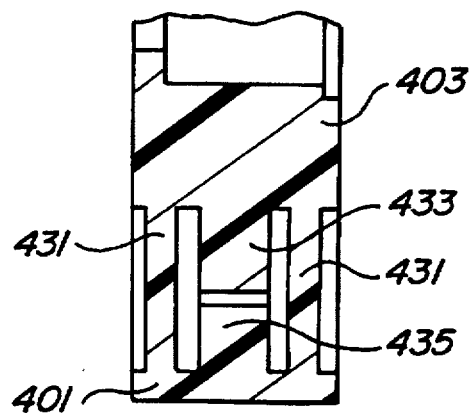
Figure 31:
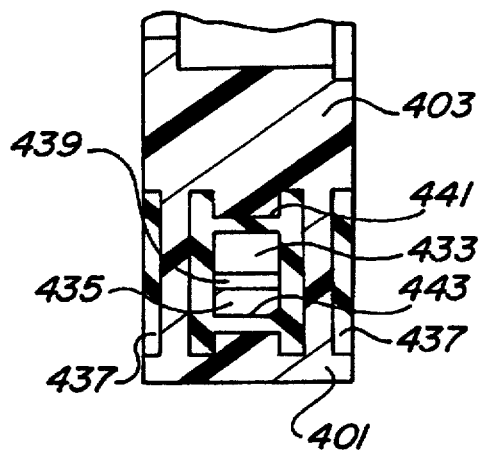
Figure 32:
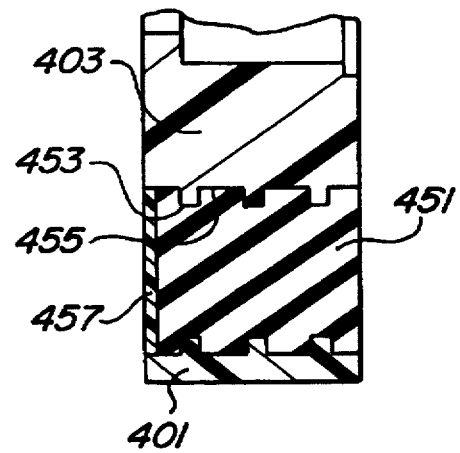
Figure 33:
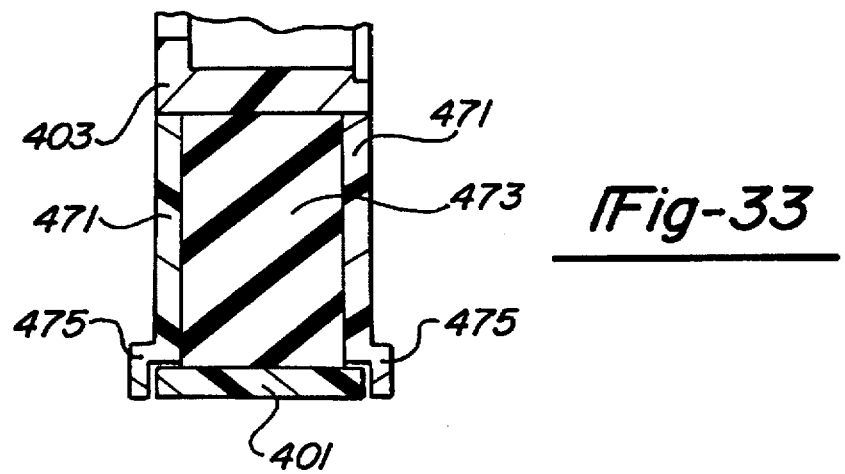
Figure 34:
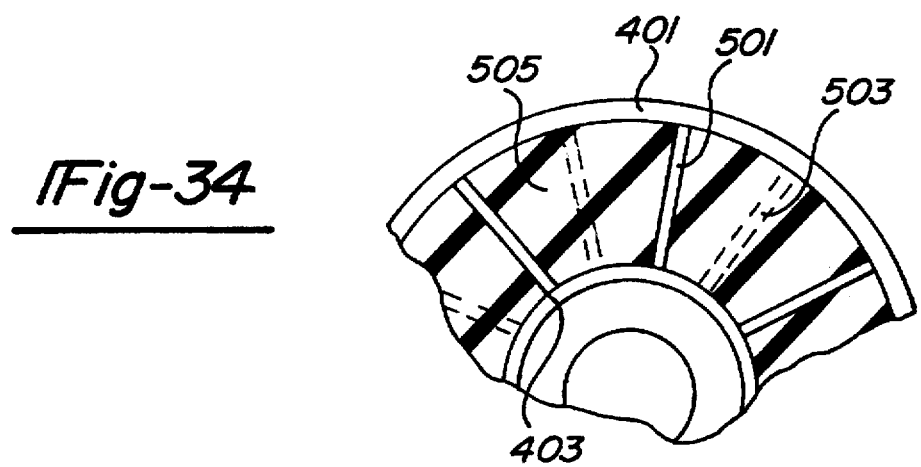
Figure 35:
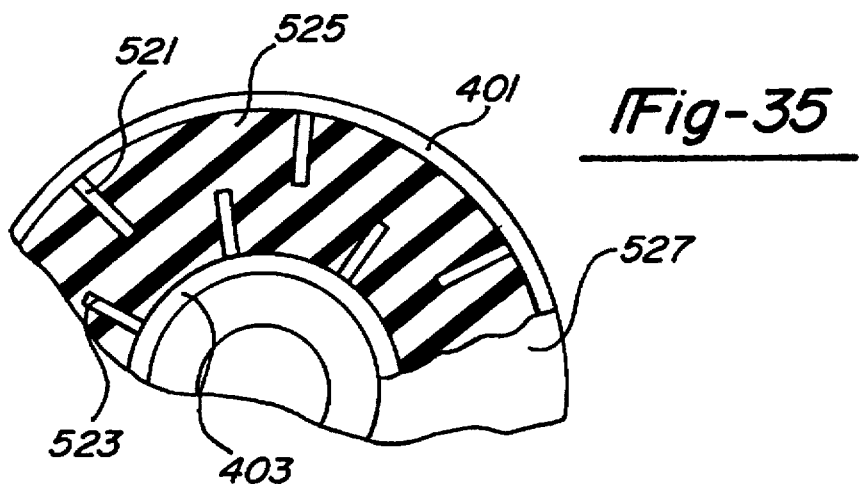

FIG. 21 is a diagrammatic side elevational view showing an eighth preferred embodiment of a rotatable apparatus of the present invention;

FIG. 22 is a side elevational view showing a ninth preferred embodiment of a rotatable apparatus of the present invention;

FIG. 23 is a diagrammatic side elevational view of a portion of the ninth preferred embodiment rotatable apparatus of the present invention;

FIG. 24 is a diagrammatic side elevational view showing a tenth preferred embodiment of a rotatable apparatus of the present invention in a nominal position;

FIG. 25 is a diagrammatic side elevational view showing a tenth preferred embodiment of a rotatable apparatus of the present invention in a stress dissipating position;

FIG. 26 is a diagrammatic side elevational view showing an eleventh preferred embodiment of a rotatable apparatus of the present invention in a nominal position;

FIG. 27 is a diagrammatic side elevational view showing the eleventh preferred embodiment rotatable apparatus of the present invention in a stress dissipating position;

FIG. 28 is a diagrammatic side elevational view showing a twelfth preferred embodiment of a rotatable apparatus of the present invention;

FIG. 29 is a diagrammatic cross-sectional view showing a first alternate embodiment of a rotatable apparatus of the present invention;

FIG. 30 is a diagrammatic cross-sectional view showing a second alternate embodiment of a rotatable apparatus of the present invention;

FIG. 31 is a diagrammatic cross-sectional view showing a third alternate embodiment of a rotatable apparatus of the present invention;

FIG. 32 is a diagrammatic cross-sectional view showing a fourth alternate embodiment of a rotatable apparatus of the present invention;

FIG. 33 is a diagrammatic cross-sectional view showing a fifth alternate embodiment of a rotatable apparatus of the present invention;

FIG. 34 is a diagrammatic side elevational view showing a sixth alternate embodiment of a rotatable apparatus of the present invention;

FIG. 35 is a diagrammatic side elevational view showing a seventh alternate embodiment of a rotatable apparatus of the present invention;

FIG. 36 is a diagrammatic side elevational view showing an eighth alternate embodiment of a rotatable apparatus of the present invention;

FIG. 37 is a diagrammatic side elevational view showing a ninth alternate embodiment of a rotatable apparatus of the present invention and FIG. 38 is a cross-sectional view, taken along line 38—38 of FIG. 37, showing the ninth alternate embodiment rotatable apparatus of the present invention.

DETAILED DESCRIPTION OF THE PREFERRED EMBODIMENTS

Referring to FIGS. 1 through 4, a first preferred embodiment of a rotatable apparatus of the present invention includes a rim 51 and concentric hub 53, both of which have external surfaces with gear teeth 54 outwardly extending therefrom. An annularly stepped ring 54a is integrally disposed between gear teeth 54b and the grooved portion of hub 53. An inner surface 55 of rim 51 is provided with a set of

6 transversely extending grooves 57. In registry therewith, an external surface 59 of hub 53 also has a set of transversely extending grooves 61. A plurality of somewhat hourglass shaped spokes 63 span between rim 51 and hub 53 by having ends thereof movably engagable within registering grooves 57 and 61. Four compression springs 65 are each disposed between adjacent spokes 63. It should be appreciated that more or less springs and spokes, as well as spokes with differing shapes, may be alternately employed.

The stress dissipating nature of this device can be observed by comparing the concurrent nominal rotation of rim 51 and hub 53 of FIG. 3 to a typical torque intensive starting up, changing of direction, or slowing down rotational mode of FIG. 4 wherein rim 51 and hub 53 rotate a differing amount or at a different speed. Spokes 63 are flexible in a direction of rotation and can be radially moved within the grooves 57 and 61 when rim 51 rotates a differing amount or at a different speed than hub 53. Thus, the stress dissipation structure, consisting of spokes 63 and springs 65, act to dissipate these rotational stresses. Additionally, a pair of annular antibuckling plates 65a are preferably fastened to hub 53 for rotational movement therewith. A retainer ring 67 is fastened to rim 51 and serves to slideably trap the adjacent antibuckling plate 65a between itself and the adjacent portion of rim 51. These antibuckling plates 65a maintain the coaxial alignment of rim 51 and hub 53 while also preventing lateral twisting differential between rim 51 and hub 53. Of course, the antibuckling plates 65a can be alternately rotationally secured to rim 51 for slidable movement against hub 53 for this and the other embodiments discussed hereinafter. The rim 51, hub 53 and antibuckling plates 65a are preferably made from a high strength steel material while the spokes and compression springs 65 are made from a high strength spring steel. This embodiment is ideally suited for use in repetitive, high temperature and load intensive applications such as for automotive vehicle transmission gears or the like. It should further be appreciated, however, that this and all of the other stress dissipation structure embodiments can be used for other rotatable members such as sprockets, clutches, driveshafts and the like.

A second preferred embodiment of a rotatable apparatus of the present invention is disclosed in FIGS. 5 through 8. In this embodiment, a high strength steel gear includes a rim 71, web 73, and hub 75. A stress dissipation structure includes a pair of oppositely disposed sets of frustoconical or belleville washers 77, each having an apperature and a compressible axis 79. The stress dissipation structure further includes a rigid pair of depressing blocks 81, four compression springs 83 and a pair of annular antibuckling plates 85. Each set of belleville washers 77 has the washers stacked on top of each other along the compressible axis and are juxtapositioned within a radial cavity 87 of web 73. Each compressing block 81 is disposed against an end of one of the belleville washers 77 for selective rotatable engagement by an outer surface discontinuity 89, such as a shape intersection, bump, or other projection of hub 75.

Hub 75 further has elliptical outer surface sections 91 bordered by flats 93. Discontinuity 89 is created at each intersection of flat 93 and elliptical section 91. Furthermore, a pair of arms 95 radially project outward from hub 75. Each arm has an enlarged distal end for engagement with ends of adjacent compression springs 83. The opposite ends of compression springs 83 are received within receptacles of web 73. Thus, as can be observed by comparing FIGS. 7 and 8, when rim 71 and hub 75 rotate differing amounts, the rotational stresses caused therebetween are initially absorbed by compression of arms 95 against compression springs 83 and then subsequently reduced by surface discontinuities 89 forcing compressing blocks 81 to axially compress belleville washers 77. This construction is extremely advantageous since the belleville washers can be fully compressed and subsequently returned to their nominal frustoconical configurations in a repetitious, high temperature and high load environment. Compression springs 83 further serve to return and center the hub in relation to the rim during nonrotational stress conditions. Alternately, web 73 may be attached to the hub while one or more surface discontinuities and arms extend inwardly from the rim 71.

FIGS. 9 through 12 illustrate a third preferred embodiment of a rotatable apparatus of the present invention. This apparatus has a rim 101 with an integrally, injection molded antibuckling plate 103 and an integrally molded and transversely extending hub inner collar 105. Furthermore, three spokes or nodules 107 extend radially inward from an inside surface of rim 101, spaced at 60 degrees from each other, and transversely extend from antibuckling plate 103. A second antibuckling plate 113 has a hub outer collar 115 of a cylindrical configuration with three spokes or nodules 117 outwardly extending therefrom in a radial manner and extending in a transverse manner from antibuckling plate 113. A natural rubber or synthetic elastomeric material 119 is insert molded or otherwise assembled between the antibuckling plates and nodules. Synethetic elastomers selected may be of the thermoplastic or thermoset type; actual optimal selection depends upon the functional use requirements of the gear under study. By way of example, Santoprene 55, a thermoplastic elastomeric, has been ostensibly used in the embodiments disclosed herein. When assembled, the nodules are equally offset from each other with the elastomeric material therebetween. In this embodiment, the radial length of the nodules overlap each other. Furthermore, outer collar 115 concentrically fits about inner collar 105 but these collars are rotatably independent from each other except for the stress dissipating characteristics and coupling effects caused by the elastomeric material therebetween.

Additionally, when assembled, a circumferencial edge 121 of antibuckling plate 113 snap fits into a circular groove 123 disposed within an inside surface of rim 101. Groove 123 serves to transversely maintain antibuckling plate 113 while still allowing it to rotate and slide freely in relation to rim 101. A pair of oppositely oriented D-shaped formations 125 are also disposed along an outer surface of antibuckling plate 113 for engagement by a driveshaft or the like. It has been found that a stress dissipation gear of this embodiment has successfully surpassed 3600 operational cycles in an accelerated, loaded windowlift motor test operating at 175° F. without failure. It should also be appreciated, that the inner collar 105 could be deleted with antibuckling plate 103 snap fitting within a groove circumferentially surrounding outer hub collar 115. The rim, hub and antibuckling plates are all preferably injection molded from an engineering material such as polyacetyl or from a modified PBT.

Figure 1:
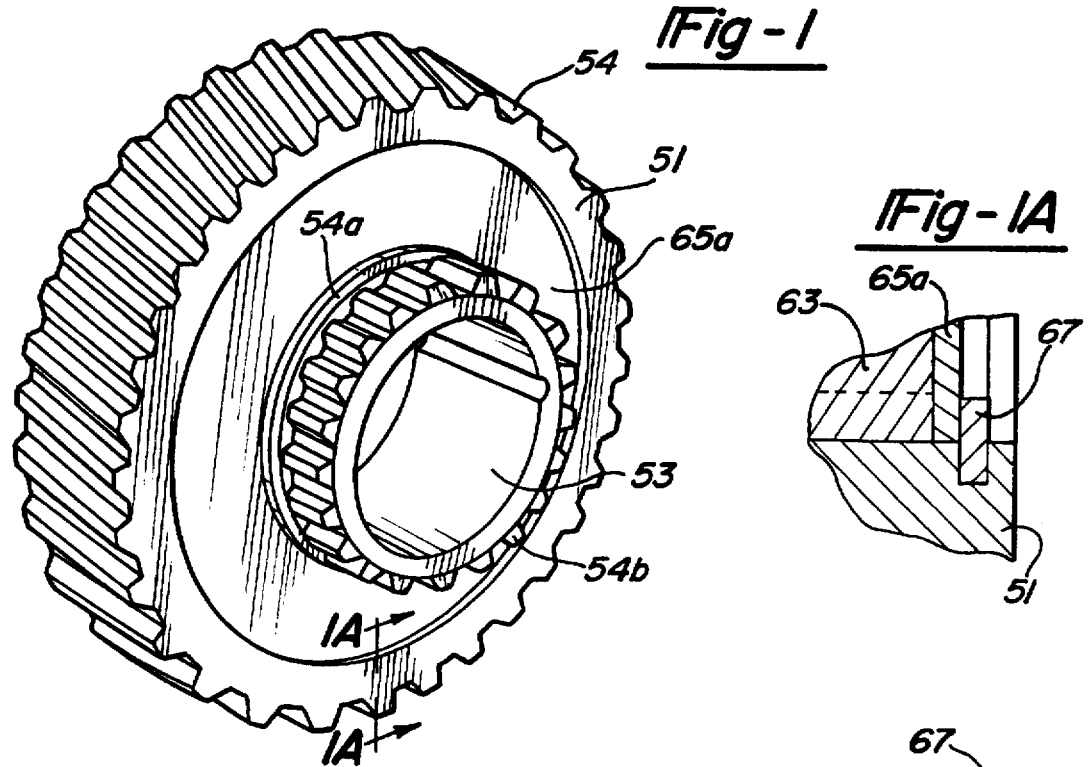
FIG. 1 is a perspective view showing a first preferred embodiment of a rotatable apparatus of the present invention.
Figure 1A:
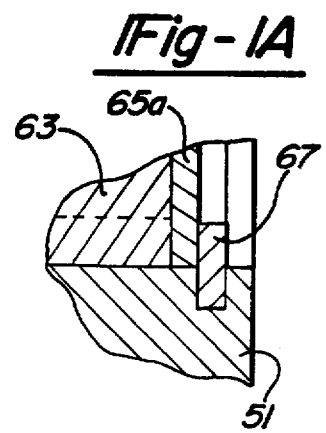
FIG. 1A is an enlarged and fragmentary cross-sectional view, taken along line 1A—1A of FIG. 1, showing the first preferred embodiment rotatable apparatus of the present invention.
Figure 2:
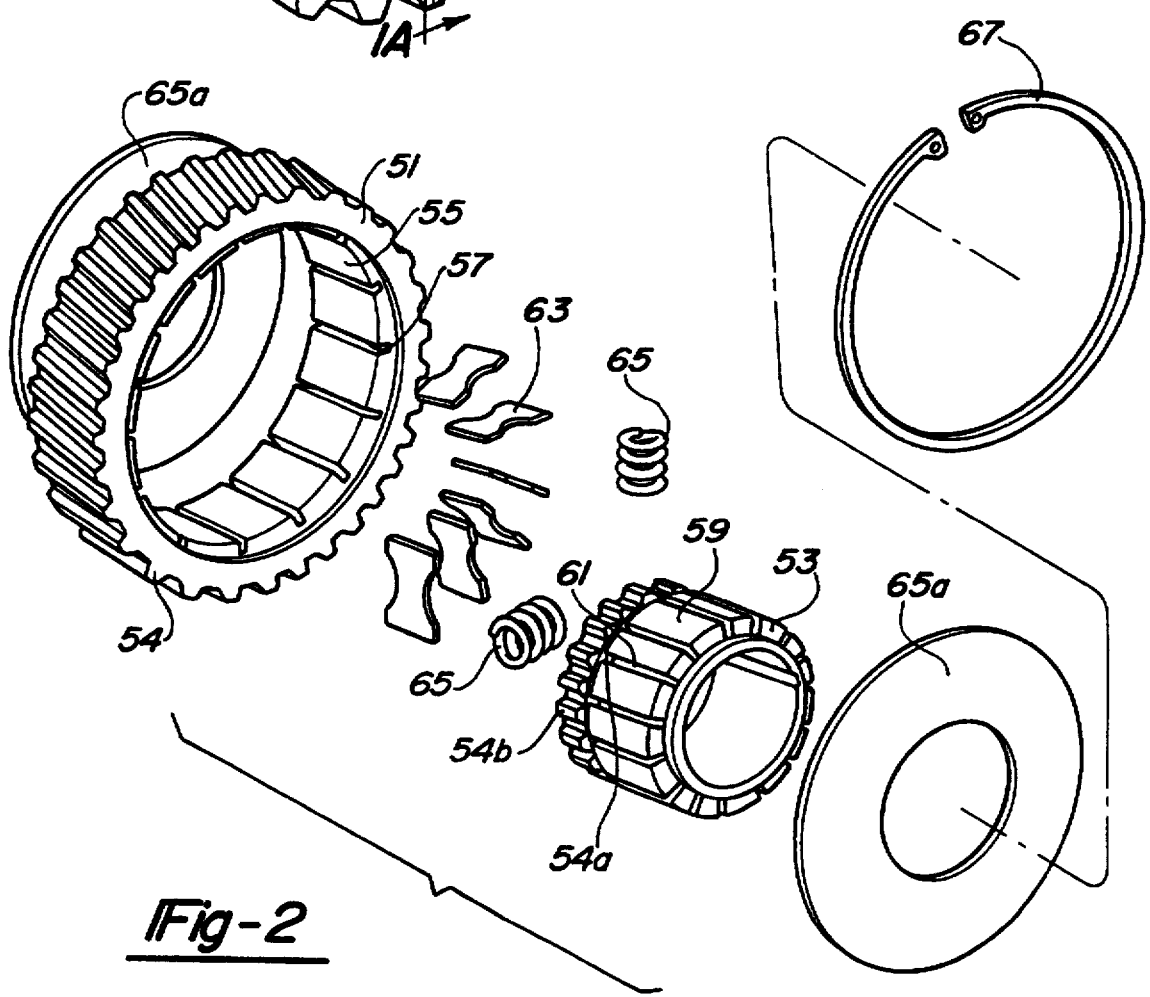
FIG. 2 is an exploded perspective view showing the first preferred embodiment rotatable apparatus of the present invention.
Figure 5:
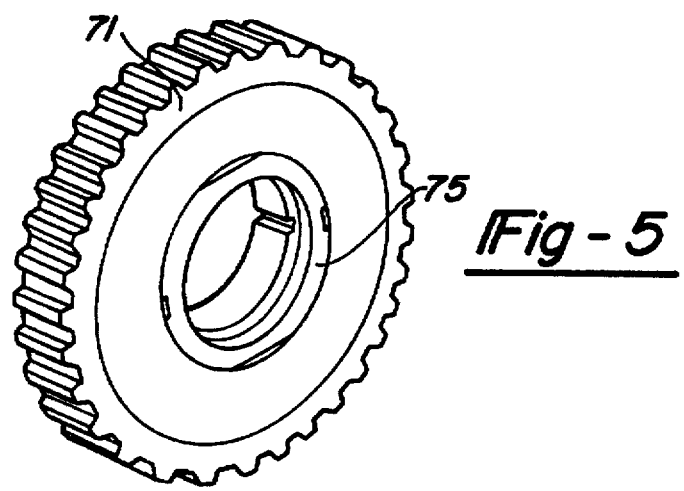
FIG. 5 is a perspective view showing a second preferred embodiment of a rotatable apparatus of the present invention.
Figure 6:
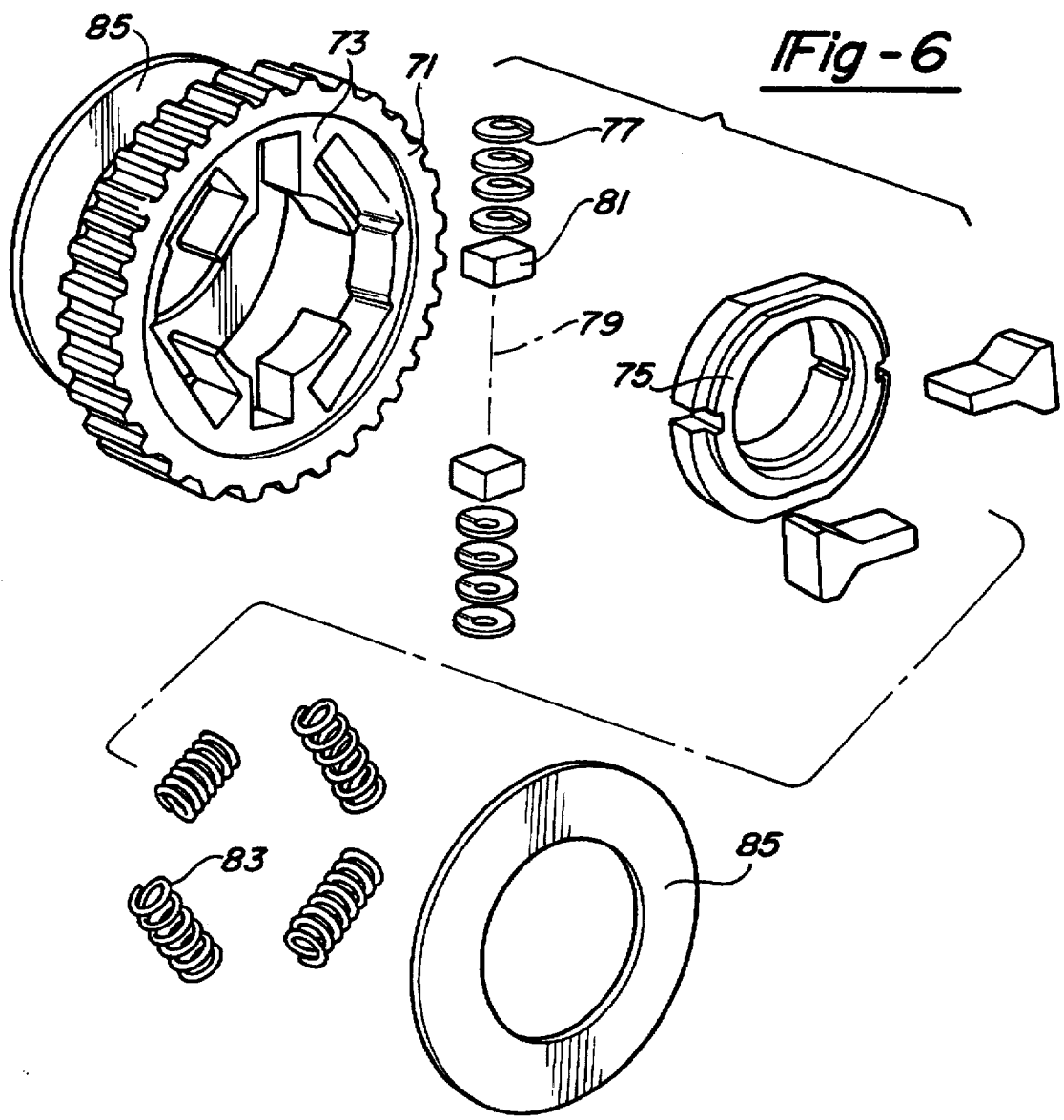
FIG. 6 is an exploded perspective view showing the second preferred embodiment rotatable apparatus of the present invention.
Figure 7:
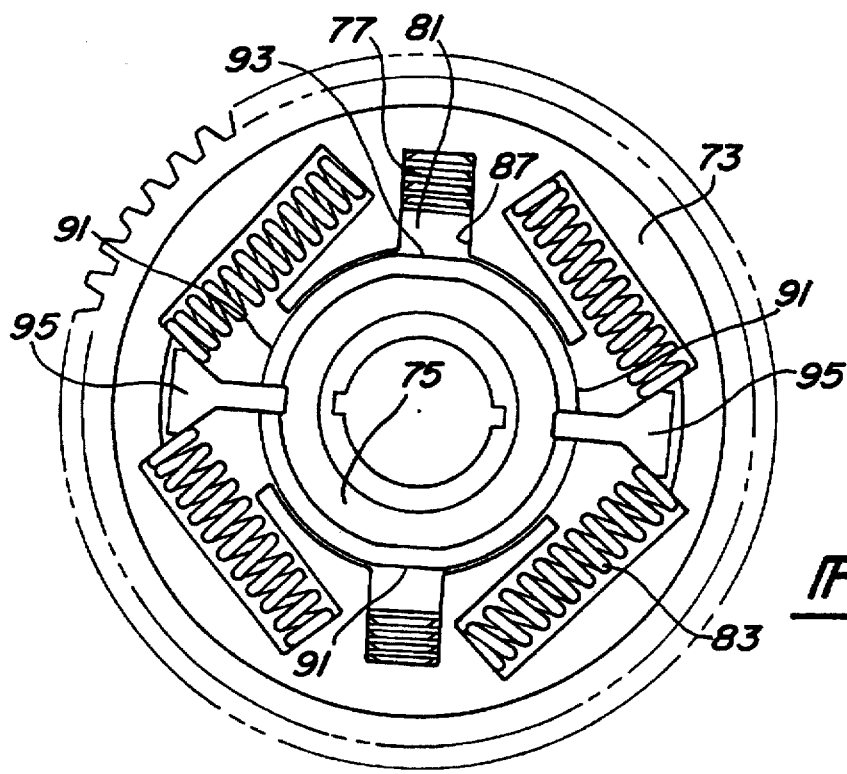
FIG. 7 is a side elevational view showing the second preferred embodiment rotatable apparatus of the present invention in a nominal position.
Figure 8:
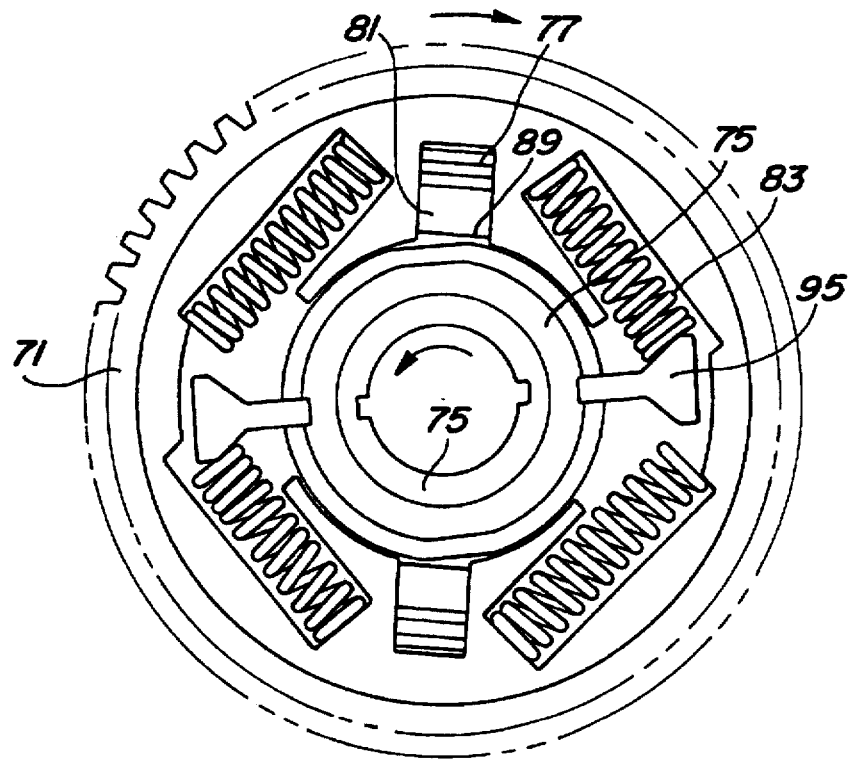
FIG. 8 is a diagrammatic side elevational view showing the second preferred embodiment rotatable apparatus of the present invention in a stress dissipating position.
Figure 9:
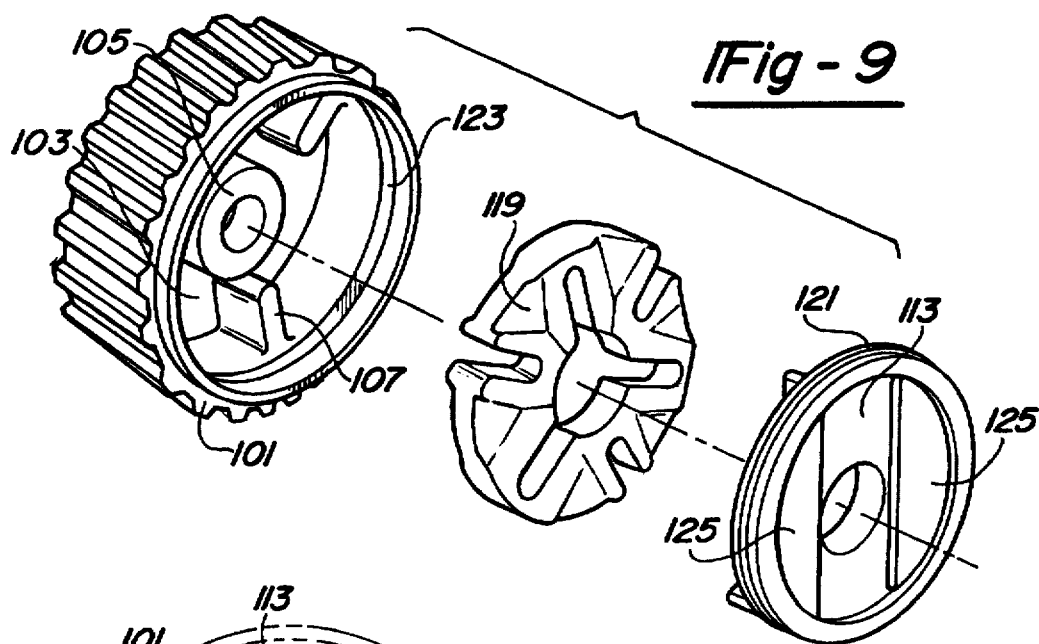
FIG. 9 is an exploded perspective view showing a third preferred embodiment of a rotatable apparatus of the present invention.
Figure 10:
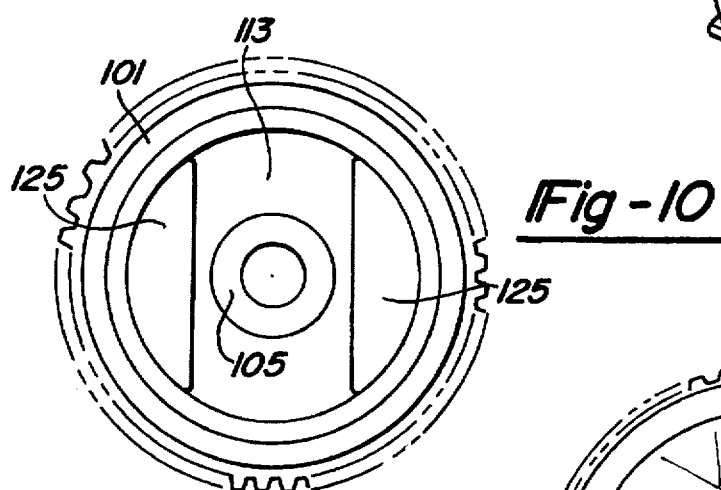
FIG. 10 is a side elevational view showing the third preferred embodiment rotatable apparatus of the present invention.
Figure 11:
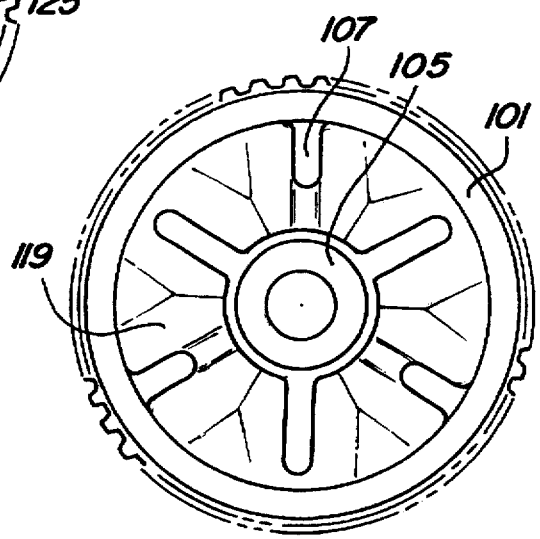
FIG. 11 is a side elevational view, with an antibuckling plate broken away therefrom, showing the third preferred embodiment rotatable apparatus of the present invention.
Figure 12:
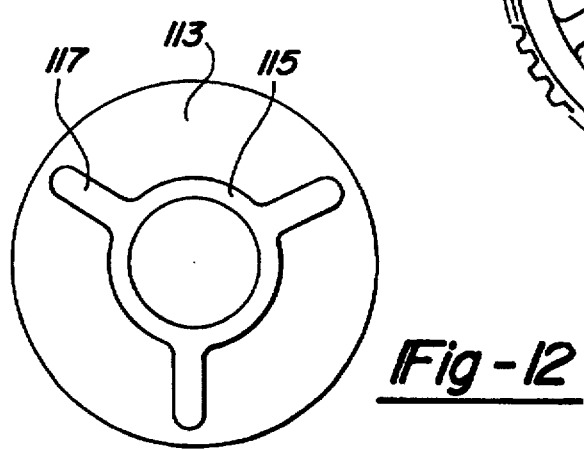
FIG. 12 is a side elevation view showing the antibuckling plate employed in the third preferred embodiment rotatable apparatus of the present invention.

Referring to FIGS. 13 through 15, a fourth preferred embodiment of a rotatable apparatus of the present invention is disclosed which is substantially the same as the third embodiment except this fourth embodiment uses an annular retainer ring 131 which is sonic welded to a rim 133 for slidably trapping antibuckling plate 135 thereagainst. This is used instead of the previously described groove. Furthermore, the double-D-shaped drive formations 137 are elevated beyond anti-buckling plate 135 in this embodiment rather than being partially depressed below a raised peripheral surface as shown in FIGS. 9 and 10. A stress dissipation structure includes nodules 139, nodules 141 and elastomeric material 143 therebetween.

FIG. 16 shows a fifth preferred embodiment of a rotatable apparatus of the present invention wherein a highly radiused set of nodules 151 that extend outwardly in a radial manner from a rim 153. Offset therefrom, is a set of nodules 155 that extend outwardly in a radial manner from a hub 157. Hub 157 can rotate independently from rim 153 with the exception of the interactions of an elastomeric material 159 disposed therebetween. As contrasted to the prior embodiments, this fifth preferred embodiment employs a non-overlapping nodule configuration wherein the radial amount of elastomeric material R between rotational paths of nodules 151 and 155 can be incrementally compressed and allowed to absorb the rotational differential stresses between rim 153 and hub 157. Thus, the theoretical area 161 represents a median stress plane wherein the greatest amount of torsional elastomeric material deformation occurs. Depending upon the specific loading and rotational member structural configurations employed, as well as the elastomeric type used, the radial length, flexibility and shape of the nodules can be varied as shown throughout the various embodiments illustrated herewith.

A sixth preferred embodiment, shown in FIG. 17, illustrates a motor assembly employing a rotatable apparatus of FIG. 9 of the present invention. This motor assembly 171 includes a motor housing 173, an armature 175, an armature shaft 177, a gear housing 179 and a gear 181 having a rotational stress dissipation structure therein. Furthermore, armature 175 is rotationally mounted upon armature shaft 177 which has a worm gear segment 183. Worm gear segment 183 extends within a bore of gear housing 179 for enmeshed engagement with external teeth of gear 181. Motor housing 173 and gear housing 179 are secured together. Motor assembly 171 is of a fractional horsepower dc variety having a fixed stator, brush cards and the like. It is envisioned that this motor can be used for driving automotive window lift mechanisms, sun roofs, and the like.

Gear 181 can be significantly reduced in diametral size due to the unified and integrated stress dissipation structure employed, such as those of the previous and following embodiments. These novel gears allow for an approximately fifty percent or more reduction in diametral size (compared to traditional multi-piece gears for the same application measuring approximately 2.15 inches). Notwithstanding, the width of the gear may need to be increased up to 100 percent, to about one lateral inch in order to maximize elastomeric cross sectional area, as compared to conventional multi-piece gears. However, such a width increase is not always necessary if different flexibility of the disclosed stress reduction structures are used. This reduction in gear diameter further allows for a proportional decrease in gear housing size due to overall compactness and use of a single assembled piece gear construction. Thus, improved motor assembly packaging for a door or sunroof assembly. Any increase in gear width and gear housing width is still no larger than the conventional thickness of the motor housing. Furthermore, the reduction in gear diameter size allows the armature shaft and armature to rotate at proportionally lower revolutions per minute (rpm). This reduced rpm has further advantageous side effects such as reducing the deceleration shock on the gear teeth during stoppage and allowing for a higher torque to be created in a direct current motor (depending on the applied load). Given a constant load, the speed/torque curves of a dc motor can be taken advantage of with the use of a lower rpm armature shaft and armature, which in turn would provide for the reduction in armature current, which would promote motor life and reduce heat generation by about 10° F. Additional reduced heat generation is achieved as a result of reduced worm rpm. Thus, the present invention gears achieve material cost savings, increased motor performance, higher use temperatures, smaller packaging sizes, system and component cost reductions, and material savings while achieving increased or at least equivalent rotational stress dissipation performance.

Figure 18:
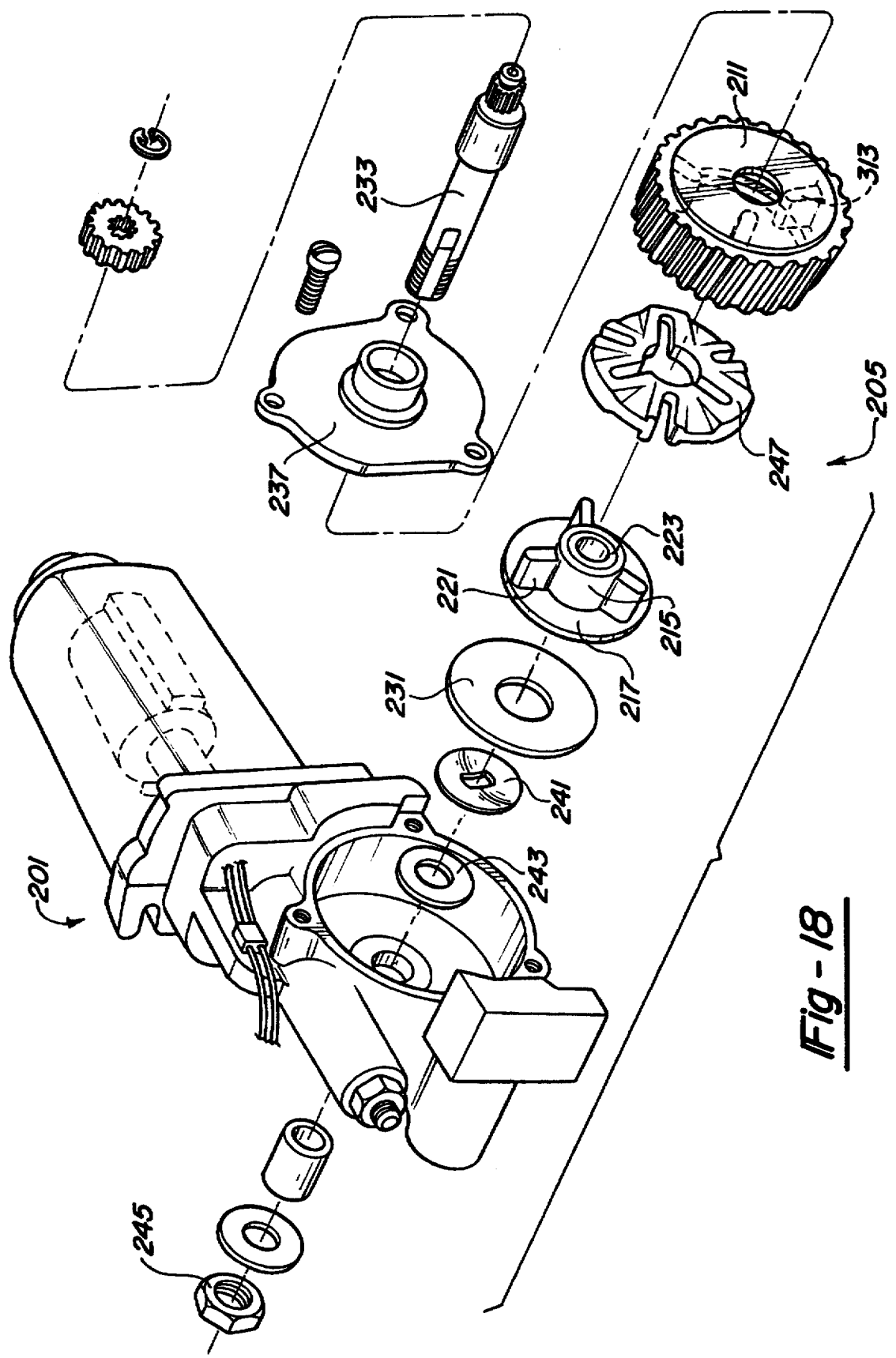
FIG. 18 is an exploded perspective view showing a seventh preferred embodiment of a motor assembly and a rotatable apparatus of the present invention.

FIGS. 18 through 20 illustrate a seventh preferred embodiment of the present invention which provides a motor assembly 201 employing a clutch mechanism 203 and a gear 205 with a stress dissipating structure. A worm gear segment 207 of armature shaft is enmeshed with external gear teeth extending from a rim 209. Rim 209 further has an antibuckling plate 211 integrally molded therewith and three nodules 313 extending inwardly therefrom. Gear 205 further has a hub 215 with an integrally formed antibuckling plate 217 radially extending outward therefrom. A circumferential edge of plate 217 engages within an inner rim groove 219. Three nodules 221 outwardly project from hub 215 and transversely project from antibuckling plate 217. An inner metal collar 223 is concentrically juxtapositioned in engaging fashion with a hub 215 for providing journaling and laterally compressive bearing surfaces. Antibuckling plate 217 is laterally depressed below an outer lateral surface of rim 209 for receiving a metal friction plate washer 231 thereagainst. Gear 205 and friction plate washer 231 can freely spin about a cylindrical portion of a pinion shaft 23 generally mounted between a gear housing 235 and a cover plate 237. A belleville washer 241 is keyholed onto shaft 233 for movement therewith. A metal washer 243 is disposed between belleville washer 241 and gear housing 235. A threaded nut 245 is threadably engaged upon a threaded end of shaft 233 and is tightened with a predetermined amount of torque to frictionally engage belleville washer 241 against friction plate washer 231. Thus, nut 245, belleville washer 241 and flat friction plate washer 231 provide a clutch function between gear 205 and pinion shaft 233. This allows for gear 205 to rotatably drive shaft 233 and a device coupled thereto unless a load induced torque is exceeded; at this point, gear will be allowed to spin without causing coincidental rotation of belleville washer 241 and pinion shaft 233. Thus, clutch mechanism 203 provides a first gear overload reduction and stress dissipation feature. A second overload reduction and stress dissipation feature is achieved through use of elastomeric material 247 disposed between nodules 221 and 107 within gear 205. The washers 231, 241 and 243 are preferably of a self-lubricous type made from a phosphor bronze or the like steel material. The gear housing is preferably injection molded from an engineering grade of polymeric material or die castable metal.

FIG. 21 shows an eighth preferred embodiment of a rotatable apparatus of the present invention. In this embodiment, a plurality of corrugated spring steel spokes 301 span between a gear rim 303 and a hub 305. Ends of the spokes 301 are disposed in hub and rim grooves similar to those disclosed in FIG. 3. Alternately, the ends of spokes 301 can be permanently affixed to either or both the hub and rim. The corrugations within each spoke 301 provide further flexibility for spokes 301. One or more anti-buckling plates 307 are also provided and an elastomeric material can further be inserted therebetween if needed.

A ninth preferred embodiment of a rotatable apparatus of the present invention is disclosed in FIGS. 22 and 23. This embodiment shows a driving sprocket 321 coupled to a driven sprocket 323 by a flexible belt 325 with internal steps therein. Alternately, a chain or perforated belt can be employed. A stress dissipation structure 327 is employed within each sprocket 321 and 323. However, any of the other prior or hereafter described stress dissipation structure embodiments can also be used for such a sprocket construction.

FIGS. 24 and 25 show a tenth preferred embodiment of a rotatable apparatus of the present invention. Specifically, the rotatable apparatus is a clutch plate 351 having a rim 353 with a friction material 355 disposed along a lateral surface or circumferential surface thereof depending on the specific clutch construction. Clutch plate 351 further has an internal stress dissipation structure 357 to account for rotational differences between rim 353 and a hub 359. FIG. 24 shows the stress dissipation structure of FIG. 7 disposed in a nominal and unstressed manner while FIG. 25 shows the same clutch plate and stress dissipation structure disposed in a differential rotation mode.

An eleventh preferred embodiment of a rotatable apparatus of the present invention can be observed in FIGS. 26 and 27, respectively showing nominal and rotational differential orientations of a clutch plate 371 having an internal stress dissipation structure 373 like that of FIG. 3.

A twelfth and final preferred embodiment of a rotatable apparatus of the present invention is shown in FIG. 28. In this twelfth embodiment, a clutch plate 375 has an internal stress dissipation structure 377 like that of FIG. 9. This embodiment is ideally designed for employment in a lower temperature, non-engine compartment/vehicle transmission application. It should also be appreciated that the use of the term "clutch plate" equally applies to clutch fly wheels and the like.

Various alternate embodiment constructions of generic rotatable apparatuses are disclosed in FIGS. 29 through 35. All of these embodiments have independent rims 401 and hubs 403 coupled together by a stress dissipation structure. For example, FIG. 29 shows a pair of disc-like elastomeric members 405 bordering an annular rib 407 and an annular web 409 with a gap 411 disposed therebetween.

In FIG. 30, sets of radially oriented and flexible spokes integrally bridge between hub 403 and rim 401 on either side of a web 4 and rib 435. The embodiment of FIG. 31 is similar to the embodiment of FIG. 30 except a plurality of laterally oriented passageways 441 and 443, respectively extend through web 433 and rib 435 within which elastomeric material 437 is molded. This provides for additional interlocking of the elastomeric material to the hub and rim. It should further be noted that although a gap 439 is present between web 433 and rib 435. It is also envisioned that such a gap may be filled with elastomeric material in this embodiment.

For the fourth alternative embodiment disclosed in FIG. 32, elastomeric material 451 is molded to engage with projections 453 and recesses 455 of hub 403 and rim 401. One or more antibuckling plates 457 are also employed. FIG. 33 shows a fifth alternate embodiment wherein a pair of antibuckling plates 471, bordering an elastomeric material 473, each have an offset end 475 for vertically supporting rim 401. FIG. 34 illustrates two sets of offset spokes 501 and 503 radially spanning between hub 403 and rim 401. An elastomeric material 505 is disposed between each spoke. It may further be desirable to have one or more antibuckling plates in combination with this arrangement. A seventh alternate embodiment is illustrated in FIG. 35 wherein radially straight and offsets of spokes or nodules 521 and 523 project respectively from rim 401 and hub 403. An elastomeric material 525 is disposed therebetween. Also one or more antibuckling plates 527 radially span between hub 403 and rim 401.

An eighth alternate embodiment of the present invention rotatable apparatus is shown in FIG. 36. Stress dissipation gear 901 has a gear toothed rim 903, a hub 905 and a stress dissipating structure 907. Stress dissipating structure 907 is further defined by a plurality of rotatably deformable shaft formations, nodules or spokes 909 which outwardly radiate from hub 905. Oppositely staggered therefrom, a plurality of triangularly shaped shaft formations, nodules or spokes 911 radially project inward from rim 903. Spokes 909 have a substantially rectangular, hexahedron shape with the bottom side attached to hub 905. Accordingly, spokes 911 compress an elastomeric material 913 against spokes 909 when there is differential rotational movement between rim 903 and hub 905. Elastomeric material 913 further serves to retain rim 903 to hub 905. In addition, various antibuckling plates may also be included. These spoke shapes are advantageous in that a constant radial dimension is provided between spokes 909 and spokes 911. Thus, stress is applied uniformly between each adjacent spoke pair.

As is illustrated in FIGS. 37 and 38, a ninth alternate embodiment of a stress dissipation gear 1001 of the present invention has an integrated spur gear 1003 and pinion gear 1005, both sharing a common rotational axis and hub 1007. A gear toothed rim 1009 of spur gear 1003 is diametrically larger than a gear toothed rim 1011 of pinion gear 1005. A stress dissipating structure 1013 is comprised of a plurality of outwardly radiating spokes or nodules 1015 and a plurality of inwardly radiating spokes or nodules 1017. Spokes 1015 and 1017 are preferably constructed in a manner similar to that of the immediately prior embodiment, however, the spokes, stops or web and rim constructions of other embodiments may be alternately employed. Stress dissipating structure 1013 further includes an elastomeric material 1019 located between hub 1007 and rims 1009 and 1011. A pair of antibuckling plates 1021 and 1023, similar to those previously disclosed heretofore, are also used this integrated spur and pinion gear construction significantly reduces the conventional multitude of individual parts which must traditionally be assembled. Thus, a cost and labor savings is achieved in addition to more consistent and uniform performance. One skilled in the art would also appreciate that additional gears or shafts or other such rotatable members may be integrated into the present exemplary embodiment gear 1001.

It should be appreciated that the present invention represents a significant quality improvement by reducing internal gear, sprocket, clutch and other rotatable member stresses due to startup shocks, shut-down shocks, overload and cyclical fatigue. The stress dissipating structure absorbs and dissipates many of the stresses created between the hub and rim such that the hub and the rim are allowed to temporarily rotate to a predesigned degree independent from one another. The present invention is also advantageous over conventional rotatable apparatuses since the present invention stress dissipation structures are easily tunable or adjustable by modifying the shapes or materials used in their creation. Furthermore, the present invention devices are more cost effective to produce and assemble due to fewer components than various conventional stress dissipation systems.

While a number of specific embodiments of the rotatable apparatus have been disclosed, it should be appreciated that various modifications may be made without departing from the present invention. For example, any of the stress dissipation structures disclosed herein, and even those of the parent patent applications upon which priority is based, can be used in combination with any of the other embodiments disclosed herein. Various materials have been disclosed in an exemplary fashion, however, a variety of other materials may of course be employed. It is intended by the following claims to cover these and any other departures from the disclosed embodiments which fall within the true spirit of this invention.

The invention claimed is:

1. A rotatable apparatus comprising:
   rotatable members including a hub and a rim, at least one of said rotatable members having a plurality of grooves transversely running along a surface thereof; and
   a plurality of flexible spokes having ends disposed in said pluralities of grooves, said spokes extending between and coupling together said hub and said rim; and
   an elastic member disposed between at least an adjacent pair of said plurality of spokes.

2. The rotatable apparatus of claim 1 further comprising an anti-buckling plate having an annular configuration and spanning between said hub and said rim.

3. The rotatable apparatus of claim 2 wherein said anti-buckling plate is securely affixed to one of said rotatable members for rotation therewith, said anti-buckling plate rides along but is substantially independently rotatable from the other of said rotatable members.

4. The rotatable apparatus of claim 3 further comprising a bolt-free snap retainer ring secured to said other of said rotatable members, said retainer ring slidably retaining an adjacent portion of said anti-buckling plate transversely against said other of said rotatable members.

5. The rotatable apparatus of claim 1 wherein each of said spokes have an hourglass peripheral shape.

6. The rotatable apparatus of claim 1 wherein said elastic member includes a compression spring.

7. The rotatable apparatus of claim 1 wherein said elastic member includes an elastomeric material.

8. The rotatable apparatus of claim 1 wherein:
   said hub has said plurality of grooves transversely running along an outer surface thereof;
   said rim has a second plurality of grooves transversely running along an inside surface thereof registering with said first plurality of grooves of said hub; and
   said plurality of spokes are radially movable within said pluralities of grooves when said hub rotates a different amount than said rim.

9. The rotatable apparatus of claim 1 further comprising a set of teeth outwardly extending from said rim.

10. The rotatable apparatus of claim 1 further comprising a friction material disposed along a surface of said rim such that said rotatable apparatus is defined as a clutch plate.

11. A rotatable apparatus comprising a plurality of flexible spokes spanning between a hub and a rim with ends of a compression spring abutting against an adjacent pair of said plurality of spokes.

12. A rotatable apparatus comprising:
   rotatable members including a hub and a rim;
   an anti-buckling plate having a substantially annular configuration and spanning between said hub and said rim; and
   a retainer ring affixed to said rim and maintaining said anti-buckling plate against said rim while allowing said anti-buckling plate to operably rotate substantially independent therefrom.

13. The rotatable apparatus of claim 12 wherein said retainer ring is sonically welded to said rim.

14. The rotatable apparatus of claim 12 further comprising means for dissipating rotational stress disposed between said rotatable members.

* * * * *